(12) United States Patent
Fujii et al.

(10) Patent No.: US 9,201,172 B2
(45) Date of Patent: Dec. 1, 2015

(54) ANTI-REFLECTION COATING, OPTICAL MEMBER HAVING IT, AND OPTICAL EQUIPMENT COMPRISING SUCH OPTICAL MEMBER

(71) Applicant: RICOH IMAGING COMPANY, LTD., Tokyo (JP)

(72) Inventors: Hideo Fujii, Itabashi-ku (JP); Hiroki Taketomo, Itabashi-ku (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 60 days.

(21) Appl. No.: 14/019,901

(22) Filed: Sep. 6, 2013

(65) Prior Publication Data

US 2014/0078589 A1    Mar. 20, 2014

(30) Foreign Application Priority Data

Sep. 14, 2012 (JP) ................. 2012-202386
Dec. 11, 2012 (JP) ................. 2012-270750
Jul. 19, 2013 (JP) ................. 2013-151037

(51) Int. Cl.
G02B 27/00     (2006.01)
G02B 1/11      (2015.01)
G02B 1/115     (2015.01)

(52) U.S. Cl.
CPC . *G02B 1/11* (2013.01); *G02B 1/115* (2013.01)

(58) Field of Classification Search
CPC ............. G02B 1/11; G02B 1/15; G02B 1/111
USPC .......... 359/601, 586–589, 577, 615; 351/163, 351/166, 177
See application file for complete search history.

(56) References Cited

U.S. PATENT DOCUMENTS 7,773,301 B2    8/2010  Terayama
2009/0290219 A1*  11/2009  Terayama ................. 359/586

FOREIGN PATENT DOCUMENTS

| JP | 2000-111702 | 4/2000 |
| JP | 2001-100002 | 4/2001 |
| JP | 2002-014203 | 1/2002 |
| JP | 2002-107506 | 4/2002 |
| JP | 2002-267801 | 9/2002 |
| JP | 2005-055569 | 3/2005 |
| JP | 2007-213021 | 8/2007 |

* cited by examiner

*Primary Examiner* — Scott J Sugarman
*Assistant Examiner* — Mustak Choudhury
(74) *Attorney, Agent, or Firm* — Greenblum & Bernstein, P.L.C.

(57) ABSTRACT

A anti-reflection coating comprising first to ninth layers laminated in this order on a substrate for having reflectance of 0.2% or less to light in a visible wavelength range of 390-720 nm, the second, fourth, sixth and eighth layers being high-refractive-index layers formed by high-refractive-index materials having refractive indices of 2.21-2.70 to a helium d-line having a wavelength of 587.56 nm; the first, third, fifth and seventh layers being intermediate-refractive-index layers formed by an intermediate-refractive-index material having a refractive index of 1.40 or more and less than 1.55 to the d-line; and the ninth layer being a low-refractive-index layer formed by a low-refractive-index material having a refractive index of 1.35 or more and less than 1.40 to the d-line.

15 Claims, 44 Drawing Sheets

Example 1-1

ANTI-REFLECTION COATING, OPTICAL MEMBER HAVING IT, AND OPTICAL EQUIPMENT COMPRISING SUCH OPTICAL MEMBER

FIELD OF THE INVENTION

The present invention relates to an anti-reflection coating having low reflectance in a wide wavelength range, an optical member such as a lens, a prism, a filter, etc. having such anti-reflection coating, and an optical equipment such as a TV camera, a video camera, a digital camera, an in-vehicle camera, a microscope, a telescope, etc., comprising such optical member.

BACKGROUND OF THE INVENTION

A single-focus lens and a zoom lens widely used for photographing and broadcasting are generally constituted by a large number of lenses, for example, about 10 to 40 lenses.

Increase in the number of lens leads to increase in the total amount of light reflected by lens surfaces, and entering of repeatedly reflected light into a photosensitive surface, causing problems such as flare and ghost, which extremely deteriorate the optical characteristics. Accordingly, these lenses have multi-layer anti-reflection coatings comprising dielectric layers having different refractive indices, each dielectric layers having optical thickness of ½λ or ¼λ to a center wavelength λ for utilizing interference effects.

For example, JP 2007-213021 A discloses an anti-reflection coating comprising first to eighth layers laminated in this order on a substrate, the first and fourth layers being made of a low-refractive-index material having a refractive index of 1.35-1.50 to a d-line having a wavelength of 587.56 nm, the third and fifth layers being made of an intermediate-refractive-index material having a refractive index of 1.55-1.85 to the d-line, and the second and sixth layers being made of a high-refractive-index material having a refractive index of 1.70-2.50, which is higher than that of the intermediate-refractive-index material, to the d-line. This anti-reflection coating has reflectance of about 0.15% or less in a wavelength range of about 400-700 nm.

JP 2002-267801 A discloses an anti-reflection coating comprising first to ninth thin, dielectric layers laminated in this order on a substrate, the second, fourth, sixth and eighth layers having a refractive index of $N_h$ at a wavelength of 550 nm, the first, third, fifth and seventh layers having a refractive index of $N_m$ at a wavelength of 550 nm, and the ninth layer having a refractive index of $N_l$ at a wavelength 550 nm, meeting $2.00 \leq N_h \leq 2.20$, $1.50 \leq N_m \leq 1.80$, and $N_l \leq 1.46$. This anti-reflection coating has reflectance of about 0.2% or less in a wavelength range of about 400-680 nm.

JP 2002-107506 A discloses an anti-reflection coating having a design wavelength $\lambda_0$ of 550 nm and comprising 10 layers laminated on a substrate, the second, fourth, sixth and ninth layers having a refractive index of 2.00 or more at the design wavelength $\lambda_0$, the first and seventh layers having a refractive index of 1.50-1.80 at the design wavelength $\lambda_0$, and the third, fifth, eighth and tenth layers having a refractive index of 1.46 or less at the design wavelength $\lambda_0$. This anti-reflection coating has reflectance of about 0.2% or less in a wavelength range of about 400-710 nm.

JP 2001-100002 A discloses an anti-reflection coating comprising first to tenth thin, dielectric layers formed in this order on a substrate, the second, fourth, sixth and ninth layers having a refractive index of $N_h$ at a wavelength of 550 nm, the first and eighth layers having a refractive index of $N_m$ at a wavelength of 550 nm, the third, fifth, seventh and tenth layers having a refractive index of $N_L$ at a wavelength of 550 nm, meeting $2.0 \leq N_h$, $1.5 \leq N_m \leq 1.8$, and $N_L \leq 1.46$. This anti-reflection coating has reflectance of about 0.2% or less in a wavelength range of about 410-690 nm.

However, these anti-reflection coatings have as narrow reflection-preventing ranges as about 300 nm in a wavelength range of 380-780 nm, which is generally called visible band. Human eyes have strong sensitivity particularly in a wavelength range of 390-720 nm in this visible band.

JP 2000-111702 A discloses a 14-layer anti-reflection coating comprising layers having a refractive index of 1.6 or more and layers having a refractive index of 1.5 or less for having wide-band reflection characteristics providing reflectance of 1% or less in a wavelength of 330-710 nm, and reflectance of 0.25% or less in a wavelength of 400-680 nm. However, this anti-reflection coating has reflectance of at most 0.25% or less in a reflection-preventing band, particularly in a visible band, failing to meet the recent demand of visible reflectance of 0.2% in digital camera lenses.

JP 2002-14203 A discloses an anti-reflection coating comprising 14-17 layers formed by $TiO_2$ having a refractive index of 2.407 and $SiO_2$ having a refractive index of 1.450 for having reflectance of 0.1% or less in a wavelength of 400-700 nm. However, the reflection-preventing wavelength range of this anti-reflection coating is as narrow as 300 nm in a wavelength range of 380-780 nm, which is generally called visible band.

Objects of the Invention

Accordingly, an object of the present invention is to provide an anti-reflection coating having excellent reflection-preventing characteristics in a wavelength range of 390-720 nm wider than the conventional reflection-preventing range of 300 nm.

Another object of the present invention is to provide an optical member having such an anti-reflection coating.

A further object of the present invention is to provide an optical equipment comprising such an optical member.

Disclosure of the Invention

As a result of intensive research in view of the above objects, the inventors have found that the alternate lamination of high-refractive-index layers and intermediate-refractive-index layers having large refractive index difference with a low-refractive-index layer as the uppermost layer provides an anti-reflection coating having low reflectance in a wide visible light band having a wavelength of 390-720 nm. The present invention has been completed based on such finding.

Thus, the anti-reflection coating according to the first embodiment of the present invention comprises first to ninth layers laminated in this order on a substrate for having reflectance of 0.2% or less to light in a visible wavelength range of 390-720 nm, the second, fourth, sixth and eighth layers being high-refractive-index layers each formed by a high-refractive-index material having a refractive index of 2.21-2.70 to a helium d-line having a wavelength of 587.56 nm;

the first, third, fifth and seventh layers being intermediate-refractive-index layers each formed by an intermediate-refractive-index material having a refractive index of 1.40 or more and less than 1.55 to the d-line; and the ninth layer being a low-refractive-index layer formed by a low-refractive-index material having a refractive index of 1.35 or more and less than 1.40 to the d-line.

In the first embodiment, the refractive index difference between the intermediate-refractive-index layers and the high-refractive-index layers is preferably 0.67-1.30.

In the first embodiment, it is preferable that the high-refractive-index material is $TiO_2$, $Nb_2O_5$, or a mixture or compound of at least two of $TiO_2$, $Nb_2O_5$, $CeO_2$, $Ta_2O_5$, $ZnO$, $ZrO_2$, $In_2O_3$, $SnO_2$ and $HfO_2$, that the intermediate-refractive-index material is $SiO_2$, $YbF_3$, $YF_3$, or a mixture or compound of at least two of $SiO_2$, $Al_2O_3$, $CeF_3$, $NdF_3$, $GdF_3$, $LaF_3$, $YbF_3$ and $YF_3$, and that the low-refractive-index material is $MgF_2$, $AlF_3$, or a mixture or compound of at least two of $MgF_2$, $AlF_3$ and $SiO_2$.

In the first embodiment, the substrate preferably has a refractive index of 1.40-2.10 to the d-line.

The anti-reflection coating according to the second embodiment of the present invention comprises first to seventh layers laminated in this order on an optical substrate with a refractive index of 1.43-1.73 to a helium d-line having a wavelength of 587.56 nm for having reflectance of 0.2% or less to light in a visible wavelength range of 390-720 nm, the first layer having a refractive index of 1.37-1.56 to the d-line, and an optical thickness of 230-290 nm;

the second layer having a refractive index of 1.85-2.7 to the d-line, and an optical thickness of 20-80 nm;

the third layer having a refractive index of 1.37-1.52 to the d-line, and an optical thickness of 10-60 nm;

the fourth layer having a refractive index of 2.1-2.7 to the d-line, and an optical thickness of 130-220 nm;

the fifth layer having a refractive index of 1.37-1.52 to the d-line, and an optical thickness of 5-40 nm;

the sixth layer having a refractive index of 2.1-2.7 to the d-line, and an optical thickness of 20-90 nm; and the seventh layer having a refractive index of 1.37-1.4 to the d-line, and an optical thickness of 100-160 nm.

In the second embodiment, the seventh layer preferably has a refractive index equal to or less than those of the first, third and fifth layers.

In the second embodiment, it is preferable that the first, third and fifth layers are made of $MgF_2$ or $SiO_2$, or a mixture or compound of $SiO_2$ with $Al_2O_3$, $Nb_2O_5$ or $TiO_2$, that the second, fourth and sixth layers are made of $TiO_2$, $Nb_2O_5$, $CeO_2$, $Ta_2O_5$, $ZrO_2$, or any of their mixtures or compounds with $SiO_2$, and that the seventh layer is made of $MgF_2$, or a mixture or compound of $MgF_2$ with $SiO_2$, $CaF_2$ or $LiF$.

The anti-reflection coating according to the third embodiment of the present invention comprises first to fourteenth layers laminated in this order on an optical substrate having a refractive index of 1.43-2.01 to helium d-line having a wavelength of 587.56 nm, the first, third, fifth, seventh, ninth, eleventh and thirteenth layers being high-refractive-index layers formed by high-refractive-index materials having refractive indices of 2.201-2.7 to the d-line;

the second, fourth, sixth, eighth, tenth and twelfth layers being intermediate-refractive-index layers formed by an intermediate-refractive-index material having a refractive index of 1.501-1.7 to the d-line;

the fourteenth layer being a low-refractive-index layer formed by a low-refractive-index material having a refractive index of 1.37-1.44 to the d-line;

the first layer having an optical thickness of 5-45 nm;
the second layer having an optical thickness of 15-125 nm;
the third layer having an optical thickness of 40-130 nm;
the fourth layer having an optical thickness of 1-45 nm;
the fifth layer having an optical thickness of 135-175 nm;
the sixth layer having an optical thickness of 20-50 nm;
the seventh layer having an optical thickness of 30-65 nm;
the eighth layer having an optical thickness of 155-180 nm;
the ninth layer having an optical thickness of 10-35 nm;
the tenth layer having an optical thickness of 45-75 nm;
the eleventh layer having an optical thickness of 147-170 nm;
the twelfth layer having an optical thickness of 5-28 nm;
the thirteenth layer having an optical thickness of 55-85 nm; and
the fourteenth layer having an optical thickness of 120-145 nm.

In the third embodiment, the optical substrate is preferably made of optical glass, resins or optical crystals.

In the third embodiment, it is preferable that the high-refractive-index material is $TiO_2$ and/or $Nb_2O_5$, that the intermediate-refractive-index material is $Al_2O_3$, a mixture of $SiO_2$ with $TiO_2$, a mixture of $SiO_2$ with $Nb_2O_5$, a mixture of $Al_2O_3$ with $TiO_2$, or a mixture of $Al_2O_3$ with $Nb_2O_5$, and that the low-refractive-index material is $MgF_2$.

The optical member of the present invention comprises any one of the above-described anti-reflection coatings.

The optical equipment of the present invention comprises any one of the above-described optical members.

DESCRIPTION OF THE PREFERRED EMBODIMENTS

[1] First Embodiment

Figure 1:
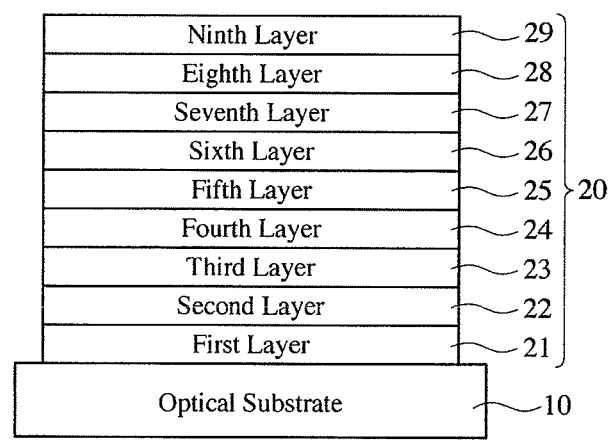
FIG. 1 is a view showing an anti-reflection coating according to the first embodiment of the present invention.

FIG. 1 is a view showing an anti-reflection coating 20 comprising first to ninth layers 21-29 laminated in this order on a substrate 10 according to the first embodiment of the present invention.

FIG. 1 shows a substrate 10 in a flat plate shape without intention of restriction, and any other substrates such as lenses, prisms, light guides, films and diffraction elements may be used. The substrate 10 preferably has a refractive index of 1.40-2.10 to a helium d-line having a wavelength of 587.56 nm, which may be called simply "d-line." Materials for the substrate 10 may be transparent materials such as glass, crystals, plastics, etc. Particularly preferable are optical glass such as FK03, FK5, BK7, SK20, SK14, LAK7, LAK10, LASF016, LASF04, SFL03, LASF08, NPH2, TAFD4, etc., Pyrex (trademark, nd=about 1.48), quartz (nd=about 1.46), blue plate glass (nd=about 1.51), white plate glass (nd=about 1.52), LUMICERA (trademark), Zerodur (trademark, nd=1.5424), fluorite (nd=1.434), sapphire, acrylics (nd=1.49), polycarbonates (nd=1.58), polyethylene terephthalate (nd=1.58), APEL (trademark, nd=1.54), ZEONEX (trademark, nd=1.53), ARTON (trademark, nd=1.52), etc.

In the anti-reflection coating 20, the second, fourth, sixth and eighth layers 22, 24, 26, 28 are high-refractive-index layers formed by high-refractive-index materials having refractive indices of 2.21-2.70 to the d-line, the first, third, fifth and seventh layers 21, 23, 25, 27 are intermediate-refractive-index layers formed by an intermediate-refractive-index material having a refractive index of 1.40 or more and less than 1.55 to the d-line, and the ninth layer 29 is a low-refractive-index layer formed by a low-refractive-index material having a refractive index of 1.35 or more and less than 1.40 to the d-line.

The anti-reflection coating 20 obtained by laminating the first to ninth layers 21-29 having the above refractive indices in this order on the substrate 10 has sufficiently reduced reflectance in a wider wavelength range with a small number of lamination. Specifically, it has as low reflectance as 0.2% or less to light having a wavelength range of 390-720 nm, which has particularly high sensitivity in a visible band of 380-780 nm.

With a large refractive index difference between the high-refractive-index layers of the second, fourth, sixth, and eighth layers 22, 24, 26, 28 and the intermediate-refractive-index layers of the first, third, fifth and seventh layers 21, 23, 25, 27, the anti-reflection coating 20 has sufficiently reduced reflectance to light in a wide, visible wavelength range of 390-720 nm without suffering thickness increase. The refractive index difference between the high-refractive-index layer and the intermediate-refractive-index layer is preferably 0.67-1.30, more preferably 0.68-1.29.

The high-refractive-index materials may be $TiO_2$, $Nb_2O_5$, or mixtures or compounds of at least two of $TiO_2$, $Nb_2O_5$, $CeO_2$, $Ta_2O_5$, ZnO, $ZrO_2$, $In_2O_3$, $SnO_2$ and $HfO_2$. $TiO_2$ and $Nb_2O_5$ can be used alone because they have high refractive indices. $CeO_2$, $Ta_2O_5$, ZnO, $ZrO_2$, $In_2O_3$, $SnO_2$ and $HfO_2$ can be used in combination, because they have refractive indices outside the range necessary for the high-refractive-index layer. Likewise, the intermediate-refractive-index materials may be $SiO_2$, $YbF_3$, $YF_3$, or mixtures or compounds of at least two of $SiO_2$, $Al_2O_3$, $CeF_3$, $NdF_3$, $GdF_3$, $LaF_3$, $YbF_3$ and $YF_3$. The low-refractive-index materials may be $MgF_2$, $AlF_3$, or mixtures or compounds of at least two of $MgF_2$, $AlF_3$ and $SiO_2$.

The high-refractive-index layer, the intermediate-refractive-index layer and the low-refractive-index layer are preferably formed by a physical deposition method such as a sputtering method, an ion plating method, a vapor deposition method, etc. It is particularly preferable to form the first to eighth layers by a sputtering method or an ion plating method, and to form the ninth layer by a high-precision vapor deposition method, thereby efficiently forming the anti-reflection coating 20 with a stable refractive index.

[2] Second Embodiment

Figure 2:
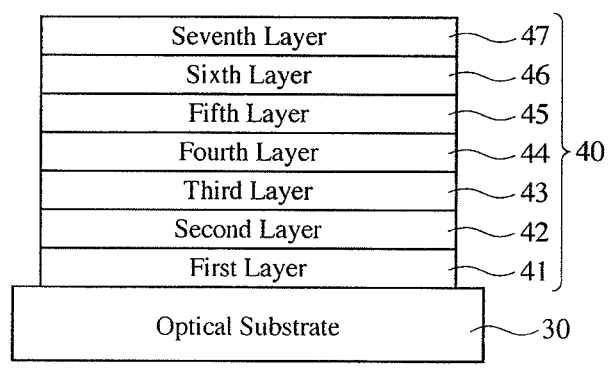
FIG. 2 is a view showing an anti-reflection coating according to the second embodiment of the present invention.

FIG. 2 is a view showing an anti-reflection coating 40 according to the second embodiment of the present invention, which comprises first to seventh layers 41-47 laminated in this order on a substrate 30.

The substrate 30 may be the same as in the first embodiment except that its refractive index to the d-line is 1.43-1.73. Particularly preferable are optical glass such as S-FPL53 (trademark, nd=1.43875), S-FSL5 (trademark, nd=1.48749), S-BSL7 (trademark, nd=1.51633), S-BAL50 (trademark, nd=1.55963), S-BSM14 (trademark, nd=1.60311), S-LAL7 (trademark, nd=1.65160), S-LAL10 (trademark, nd=1.72000), etc., Pyrex (trademark, nd-1.48), quartz (nd-1.46), blue plate glass (nd-1.51), white plate glass (nd-1.52), Zerodur (trademark, nd=1.5424), fluorite (nd=1.434), acrylics (nd=1.49), polycarbonates (nd=1.58), polyethylene terephthalate (nd=1.58), APEL (trademark, nd=1.54), ZEONEX (trademark, nd=1.53), ARTON (trademark, nd=1.52), etc.

In the anti-reflection coating 40, the first layer 41 has a refractive index of 1.37-1.56 to the d-line and an optical thickness of 230-290 nm, the second layer 42 has a refractive index of 1.85-2.7 to the d-line and an optical thickness of 20-80 nm, the third layer 43 has a refractive index of 1.37-1.52 to the d-line and an optical thickness of 10-60 nm, the fourth layer 44 has a refractive index of 2.1-2.7 to the d-line and an optical thickness of 130-220 nm, the fifth layer 45 has a refractive index of 1.37-1.52 to the d-line and an optical thickness of 5-40 nm, the sixth layer 46 has a refractive index of 2.1-2.7 to the d-line and an optical thickness of 20-90 nm, and the seventh layer 47 has a refractive index of 1.37-1.4 to the d-line and an optical thickness of 100-160 nm.

The anti-reflection coating 40 has a 7-layer structure, which is obtained by substituting the first to third layers 21, 22, 23 in the anti-reflection coating 20 according to the first embodiment with the first layer 41. With each layer having a refractive index and an optical thickness within the above ranges in the 7-layer structure, reflectance can be reduced sufficiently in a wide wavelength range with a small number UI lamination. Specifically, the reflectance to light in a wavelength range of 390-720 nm, which has high sensitivity among the visible band of 380-780 nm, is reduced to 0.2% or less.

With a large refractive index difference between the second, fourth and sixth layers 42, 44, 46 having a high refractive index and the first, third, fifth and seventh layers 41, 43, 45, 47 having a low refractive index, the anti-reflection coating 40 has sufficiently reduced reflectance to light in a wide, visible wavelength range of 390-720 nm without suffering thickness increase. Particularly preferable is a large refractive index difference between the second, fourth and sixth layers 42, 44, 46 having a high refractive index and the first, third, fifth and seventh layers 41, 43, 45, 47 having a low refractive index. Specifically, the refractive index difference between the second, fourth and sixth layers 42, 44, 46 and the first, third, fifth and seventh layers 41, 43, 45, 47 is preferably 0.49-1.4, more preferably 0.7-1.33. The preferred refractive indices of the second, fourth and sixth layers 42, 44, 46 are 2.1-2.7.

The seventh layer 47 preferably has a refractive index equal to or less than those of the first, third and fifth layers 41, 43, 45. With the seventh layer 47, which is the outermost layer of the anti-reflection coating 40, provided with a low refractive index, the anti-reflection coating 40 has reduced reflectance in a wide wavelength range. The refractive index of the seventh layer 47 is preferably 1.37 or more and less than 1.4, more preferably 1.375-1.395. Also, the first layer 41 preferably has a refractive index of 1.38-1.56, and the third and fifth layers 43, 45 preferably have refractive indices of 1.38-1.52.

The refractive index of the seventh layer 47 is preferably lower than that of the first layer 41 by 0.0001-0.19, and lower than those of the third and fifth layers 43, 45 by 0.001-0.19. With the refractive index of the seventh layer 47, which is the outermost layer of the anti-reflection coating 40, lower than those of the first, third and fifth layers 41, 43, 45, the anti-reflection coating 40 has further reduced reflectance.

Materials for the second, fourth and sixth layers 42, 44, 46 may be $TiO_2$, $Nb_2O_5$, $CeO_2$, $Ta_2O_5$, $ZrO_2$, or their mixtures or compounds with $SiO_2$. $TiO_2$, $Nb_2O_5$, $CeO_2$, $Ta_2O_5$ and $ZrO_2$ can be used alone for the second, fourth and sixth layers 42, 44, 46, because they have high refractive indices. They are also usable in combination with $SiO_2$. Materials for the first, third and fifth layers 41, 43, 45 may be $MgF_2$, $SiO_2$, or mixtures or compounds of $SiO_2$ with $Al_2O_3$, $Nb_2O_5$ or $TiO_2$. Materials for the seventh layer 47 may be $MgF_2$, or mixtures or compounds of $MgF_2$ with $SiO_2$, $CaF_2$ or LiF.

The first to seventh layers 41-47 are preferably formed by the above physical deposition method. It is particularly preferable to form the first to sixth layers by a sputtering method or an ion plating method, and to form the seventh layer by a high-precision vapor deposition method, thereby efficiently forming the anti-reflection coating 40 with a stable refractive index.

[3] Third Embodiment

Figure 3:
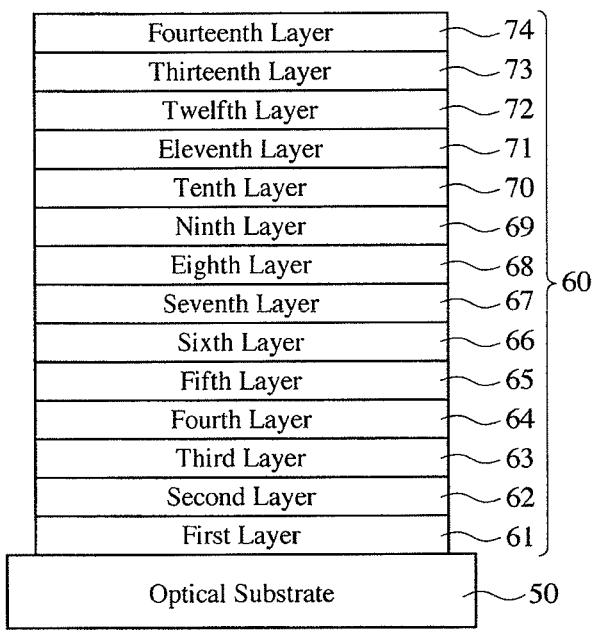
FIG. 3 is a view showing an anti-reflection coating according to the third embodiment of the present invention.

FIG. 3 is a view showing an anti-reflection coating 60 comprising first to fourteenth layers 61-74 laminated in this order on a substrate 50 according to the third embodiment of the present invention.

The substrate 50 may be the same as in the first embodiment except that its refractive index to the d-line is 1.43-2.01. Particularly preferable are optical glass such as FK03, FK5, BK7, SK20, SK14, LAK7, LAK10, LASF016, LASF04, SFL03, LASF08, NPH2, TAFD4, S-FPL53 (trademark, nd=1.4388), S-PSL5 (trademark, nd=1.48749), S-BSL7 (trademark, nd=1.5163), S-BAL50 (trademark, nd=1.55963), S-BSM14 (trademark, nd=1.60311), S-LAL7 (trademark, nd=1.65160), S-LAL10 (trademark, nd=1.72000), etc., Pyrex (trademark, nd=about 1.48), quartz (nd=about 1.46), blue plate glass (nd=about 1.51), white plate glass (nd=about 1.52), LUMICERA (trademark), Zerodur (trademark, nd=1.5424), fluorite (nd=1.434), sapphire, acrylics (nd=1.49), polycarbonates (nd=1.58), polyethylene terephthalate (nd=1.58), APEL (trademark, nd=1.54), ZEONEX (trademark, nd=1.53), ARTON (trademark, nd=1.52), etc.

In the anti-reflection coating 60, the first, third, fifth, seventh, ninth, eleventh and thirteenth layers 61, 63, 65, 67, 69, 71, 73 are high-refractive-index layers formed by high-refractive-index materials having refractive indices of 2.201-2.7 to the d-line, the second, fourth, sixth, eighth, tenth and twelfth layers 62, 64, 66, 68, 70, 72 are intermediate-refractive-index layers formed by intermediate-refractive-index materials having refractive indices of 1.501-1.7 to the d-line, and the fourteenth layer 74 is a low-refractive-index layer formed by a low-refractive-index material having a refractive index of 1.37-1.44 to the d-line.

The anti-reflection coating 60 having the above layer structure, which is formed on the substrate 50, has sufficiently reduced reflectance in a wide wavelength range including a visible long-wavelength range. Specifically, the reflectance to incident light perpendicular to the substrate 50 can be reduced to 0.1% or less in a wavelength bandwidth of 330 nm between 390 nm and 720 nm.

The high-refractive-index layers preferably have refractive indices of 2.201-2.500, the intermediate-refractive-index layers preferably have refractive indices of 1.501-1.690, and the low-refractive-index layer preferably has a refractive index of 1.370-1.430, thereby reducing reflectance in a wavelength bandwidth of 330 nm between 390 nm and 720 nm.

The high-refractive-index materials may be $TiO_2$ and/or $Nb_2O_5$. The intermediate-refractive-index materials may be $Al_2O_3$, mixtures of $SiO_2$ with $TiO_2$ or $Nb_2O_5$, or mixtures of $Al_2O_3$ with $TiO_2$ or $Nb_2O_5$. The low-refractive-index material may be $MgF_2$.

The first layer 61 has an optical thickness of 5-45 nm, the second layer 62 has an optical thickness of 15-125 nm, the third layer 63 has an optical thickness of 40-130 nm, the fourth layer 64 has an optical thickness of 1-45 nm, the fifth layer 65 has an optical thickness of 135-175 nm, the sixth layer 66 has an optical thickness of 20-50 nm, the seventh layer 67 has an optical thickness of 30-65 nm, the eighth layer 68 has an optical thickness of 155-180 nm, the ninth layer 69 has an optical thickness of 10-35 nm, the tenth layer 70 has an optical thickness of 45-75 nm, the eleventh layer 71 has an optical thickness of 147-170 nm, the twelfth layer 72 has an optical thickness of 5-28 nm, the thirteenth layer 73 has an optical thickness of 55-85 nm, and the fourteenth layer 74 has an optical thickness of 120-145 nm.

The first to fourteenth layers 61-74 are preferably formed by the above physical deposition method. It is particularly preferable to form the first to thirteenth layers by a sputtering method or an ion plating method, and to form the fourteenth layer by a high-precision vapor deposition method, thereby efficiently forming the anti-reflection coating 60 with a stable refractive index.

[4] Optical Members and Optical Equipments

The optical members of the present invention comprising the above anti-reflection coatings have excellent refractive index characteristics, suitable as lenses, prisms, filters, etc. for optical equipments such as TV cameras, video cameras, digital cameras, in-vehicle cameras, microscopes, telescopes, etc.

Though the embodiments of the present invention have been explained referring to the attached drawings, proper modifications and additions may be made within the scope of the present invention. For example, the anti-reflection coating 20, 40, 60 may comprise additional films unless its characteristics are affected. Also, thin films having different refractive indices may be interposed between any adjacent layers, and at least one layer may be substituted by pluralities of films, unless the characteristics of the anti-reflection coating are affected.

It should be noted that the layer materials are not restricted to those described above, but any materials having desired refractive indices may be used.

refractive index of the substrate 10 and the optical thickness of each layer in the anti-reflection coating 20 in each Example 1-1 to 1-13 are shown in Table 1. Using a design wavelength $\lambda_0$ of 550 nm, the optical thickness of each layer is expressed by number×$\lambda_0$ in Table 1. The spectral reflectance of each anti-reflection coating 20 of Examples 1-1 to 1-13 to perpendicular incident light was calculated by simulation, with reflection on an opposite surface of the substrate 10 to the anti-reflection coating 20 neglected. The calculation results are shown in FIG. 4-16.

TABLE 1

| | Substrate | | Optical Thickness (×$\lambda_0$) of Each Layer | | | |
|---|---|---|---|---|---|---|
| Examples | Material | Refractive Index | 1st Layer $SiO_2$ | 2nd Layer $TiO_2$ | 3rd Layer $SiO_2$ | 4th Layer $TiO_2$ |
| 1-1 | FK03 | 1.44 | 0.11 | 0.02 | 0.13 | 0.1 |
| 1-2 | FK5 | 1.49 | 0.11 | 0.03 | 0.13 | 0.1 |
| 1-3 | BK7 | 1.52 | 0.11 | 0.03 | 0.14 | 0.1 |
| 1-4 | SK20 | 1.56 | 0.11 | 0.04 | 0.14 | 0.11 |
| 1-5 | SK14 | 1.60 | 0.11 | 0.04 | 0.14 | 0.11 |
| 1-6 | LAK7 | 1.65 | 0.1 | 0.05 | 0.14 | 0.11 |
| 1-7 | LAK10 | 1.72 | 0.09 | 0.05 | 0.14 | 0.11 |
| 1-8 | LASF016 | 1.77 | 0.08 | 0.06 | 0.13 | 0.12 |
| 1-9 | LASF04 | 1.82 | 0.07 | 0.07 | 0.12 | 0.12 |
| 1-10 | SFL03 | 1.85 | 0.07 | 0.07 | 0.12 | 0.12 |
| 1-11 | LASF08 | 1.88 | 0.06 | 0.08 | 0.11 | 0.13 |
| 1-12 | NPH2 | 1.92 | 0.06 | 0.09 | 0.1 | 0.13 |
| 1-13 | TAFD40 | 2.00 | 0.06 | 0.09 | 0.1 | 0.14 |

| | Optical Thickness (×$\lambda_0$) of Each Layer | | | | |
|---|---|---|---|---|---|
| Examples | 5th Layer $SiO_2$ | 6th Layer $TiO_2$ | 7th Layer $SiO_2$ | 8th Layer $TiO_2$ | 9th Layer $MgF_2$ |
| 1-1 | 0.05 | 0.31 | 0.04 | 0.1 | 0.24 |
| 1-2 | 0.05 | 0.31 | 0.04 | 0.1 | 0.25 |
| 1-3 | 0.05 | 0.32 | 0.04 | 0.1 | 0.25 |
| 1-4 | 0.05 | 0.32 | 0.04 | 0.1 | 0.25 |
| 1-5 | 0.06 | 0.32 | 0.04 | 0.1 | 0.25 |
| 1-6 | 0.05 | 0.32 | 0.04 | 0.1 | 0.25 |
| 1-7 | 0.06 | 0.32 | 0.04 | 0.1 | 0.25 |
| 1-8 | 0.05 | 0.33 | 0.04 | 0.1 | 0.25 |
| 1-9 | 0.05 | 0.33 | 0.04 | 0.1 | 0.25 |
| 1-10 | 0.05 | 0.33 | 0.04 | 0.1 | 0.25 |
| 1-11 | 0.05 | 0.33 | 0.04 | 0.1 | 0.25 |
| 1-12 | 0.05 | 0.33 | 0.04 | 0.1 | 0.25 |
| 1-13 | 0.05 | 0.33 | 0.04 | 0.1 | 0.25 |

The optimum optical thickness [refractive index (n)×physical thickness (d)] of each layer can be determined by computer simulation using the refractive indices of the substrate and all layers.

The present invention will be explained in further detail by Examples below without intention of restricting the present invention thereto.

EXAMPLES 1-1 TO 1-13

In each anti-reflection coating 20 according to the first embodiment, which comprised high-refractive-index layers 22, 24, 26 and 28 made of $TiO_2$ having a refractive index of 2.46 to the d-line, intermediate-refractive-index layers 21, 23, 25 and 27 made of $SiO_2$ having a refractive index of 1.48 to the d-line, and a low-refractive-index layer 29 made of $MgF_2$ having a refractive index of 1.39 to the d-line, with air having a refractive index of 1.00 as an incident-side medium, the optimum optical thickness of each layer 21-29 for each substrate 10 was determined by simulation. The material and

EXAMPLES 2-1 TO 2-13

In each anti-reflection coating 20 according to the first embodiment, which comprised high-refractive-index layers 22, 24, 26 and 28 made of $Nb_2O_5$ having a refractive index of 2.31 to the d-line, intermediate-refractive-index layers 21, 23, 25 and 27 made of $SiO_2$ having a refractive index of 1.48 to the d-line, and a low-refractive-index layer 29 made of $MgF_2$ having a refractive index of 1.39 to the d-line, with air having a refractive index of 1.00 as an incident-side medium, the optimum optical thickness of each layer 21-29 for each substrate 10 was calculated by simulation. The material and refractive index of the substrate 10 and the optical thickness of each layer in the anti-reflection coating 20 in each Example 2-1 to 2-13 are shown in Table 2. The spectral reflectance of each anti-reflection coating 20 of Examples 2-1 to 2-13 to perpendicular incident light was calculated by simulation. The calculation results are shown in FIGS. 17-29.

TABLE 2

| Examples | Substrate | | Optical Thickness (×$\lambda_0$) of Each Layer | | | |
|---|---|---|---|---|---|---|
| | Material | Refractive Index | 1st Layer SiO$_2$ | 2nd Layer Nb$_2$O$_5$ | 3rd Layer SiO$_2$ | 4th Layer Nb$_2$O$_5$ |
| 2-1 | FK03 | 1.44 | 0.07 | 0.02 | 0.15 | 0.09 |
| 2-2 | FK5 | 1.49 | 0.14 | 0.03 | 0.14 | 0.1 |
| 2-3 | BK7 | 1.52 | 0.21 | 0.02 | 0.16 | 0.09 |
| 2-4 | SK20 | 1.56 | 0.16 | 0.03 | 0.17 | 0.09 |
| 2-5 | SK14 | 1.60 | 0.15 | 0.03 | 0.18 | 0.09 |
| 2-6 | LAK7 | 1.65 | 0.12 | 0.04 | 0.17 | 0.09 |
| 2-7 | LAK10 | 1.72 | 0.09 | 0.06 | 0.15 | 0.11 |
| 2-8 | LASF016 | 1.77 | 0.08 | 0.06 | 0.13 | 0.11 |
| 2-9 | LASF04 | 1.82 | 0.07 | 0.07 | 0.12 | 0.12 |
| 2-10 | SFL03 | 1.85 | 0.07 | 0.08 | 0.12 | 0.12 |
| 2-11 | LASF08 | 1.88 | 0.06 | 0.08 | 0.11 | 0.12 |
| 2-12 | NPH2 | 1.92 | 0.06 | 0.09 | 0.11 | 0.13 |
| 2-13 | TAFD40 | 2.00 | 0.05 | 0.1 | 0.1 | 0.13 |

| Examples | Optical Thickness (×$\lambda_0$) of Each Layer | | | | |
|---|---|---|---|---|---|
| | 5th Layer SiO$_2$ | 6th Layer Nb$_2$O$_5$ | 7th Layer SiO$_2$ | 8th Layer Nb$_2$O$_5$ | 9th Layer MgF$_2$ |
| 2-1 | 0.06 | 0.3 | 0.04 | 0.11 | 0.24 |
| 2-2 | 0.06 | 0.3 | 0.04 | 0.11 | 0.24 |
| 2-3 | 0.06 | 0.31 | 0.04 | 0.11 | 0.24 |
| 2-4 | 0.07 | 0.31 | 0.04 | 0.11 | 0.24 |
| 2-5 | 0.07 | 0.31 | 0.04 | 0.11 | 0.24 |
| 2-6 | 0.07 | 0.32 | 0.04 | 0.11 | 0.24 |
| 2-7 | 0.06 | 0.32 | 0.04 | 0.11 | 0.24 |
| 2-8 | 0.06 | 0.33 | 0.04 | 0.11 | 0.24 |
| 2-9 | 0.06 | 0.33 | 0.04 | 0.11 | 0.24 |
| 2-10 | 0.06 | 0.33 | 0.04 | 0.11 | 0.25 |
| 2-11 | 0.06 | 0.33 | 0.04 | 0.11 | 0.24 |
| 2-12 | 0.06 | 0.33 | 0.04 | 0.11 | 0.24 |
| 2-13 | 0.05 | 0.34 | 0.04 | 0.11 | 0.24 |

EXAMPLES 3-1 TO 3-13

In each anti-reflection coating 20 according to the first embodiment, which comprised high-refractive-index layers 22, 24, 26 and 28 made of a mixture of Nb$_2$O$_5$ and HfO$_2$ having a refractive index of 2.21 to the d-line, intermediate-refractive-index layers 21, 23, 25 and 27 made of SiO$_2$ having a refractive index of 1.47 to the d-line, and a low-refractive-index layer 29 made of MgF$_2$ having a refractive index of 1.39 to the d-line, with air having a refractive index of 1.00 as an incident-side medium, the optimum optical thickness of each layer 21-29 for each substrate 10 was calculated by simulation. The material and refractive index of the substrate 10 and the optical thickness of each layer in the anti-reflection coating 20 in Examples 3-1 to 3-13 are shown in Table 3. The spectral reflectance of each anti-reflection coating 20 of Examples 3-1 to 3-13 to perpendicular incident light was calculated by simulation. The calculation results are shown in FIGS. 30-42.

TABLE 3

| Examples | Substrate | | Optical Thickness (×$\lambda_0$) of Each Layer | | | |
|---|---|---|---|---|---|---|
| | Material | Refractive Index | 1st Layer SiO$_2$ | 2nd Layer Nb$_2$O$_5$ + HfO$_2$ | 3rd Layer SiO$_2$ | 4th Layer Nb$_2$O$_5$ + HfO$_2$ |
| 3-1 | FK03 | 1.44 | 0.31 | 0.01 | 0.59 | 0.07 |
| 3-2 | FK5 | 1.49 | 0.55 | 0.01 | 0.6 | 0.07 |
| 3-3 | BK7 | 1.52 | 0.05 | 0.01 | 0.56 | 0.07 |
| 3-4 | SK20 | 1.56 | 0.05 | 0.01 | 0.46 | 0.07 |
| 3-5 | SK14 | 1.60 | 0.06 | 0.01 | 0.44 | 0.07 |
| 3-6 | LAK7 | 1.65 | 0.07 | 0.02 | 0.43 | 0.06 |
| 3-7 | LAK10 | 1.72 | 0.07 | 0.02 | 0.43 | 0.06 |
| 3-8 | LASF016 | 1.77 | 0.07 | 0.03 | 0.43 | 0.06 |
| 3-9 | LASF04 | 1.82 | 0.07 | 0.04 | 0.43 | 0.06 |
| 3-10 | SFL03 | 1.85 | 0.07 | 0.04 | 0.43 | 0.06 |
| 3-11 | LASF08 | 1.88 | 0.07 | 0.05 | 0.44 | 0.06 |
| 3-12 | NPH2 | 1.92 | 0.07 | 0.05 | 0.44 | 0.05 |
| 3-13 | TAFD40 | 2.00 | 0.06 | 0.06 | 0.44 | 0.05 |

TABLE 3-continued

| | Optical Thickness (×λ₀) of Each Layer | | | | |
|---|---|---|---|---|---|
| Examples | 5th Layer SiO$_2$ | 6th Layer Nb$_2$O$_5$ + HfO$_2$ | 7th Layer SiO$_2$ | 8th Layer Nb$_2$O$_5$ + HfO$_2$ | 9th Layer MgF$_2$ |
| 3-1 | 0.08 | 0.3 | 0.03 | 0.12 | 0.24 |
| 3-2 | 0.08 | 0.3 | 0.03 | 0.12 | 0.24 |
| 3-3 | 0.08 | 0.3 | 0.03 | 0.12 | 0.24 |
| 3-4 | 0.08 | 0.29 | 0.03 | 0.12 | 0.24 |
| 3-5 | 0.08 | 0.28 | 0.03 | 0.13 | 0.24 |
| 3-6 | 0.08 | 0.28 | 0.03 | 0.13 | 0.24 |
| 3-7 | 0.07 | 0.27 | 0.03 | 0.12 | 0.24 |
| 3-8 | 0.07 | 0.27 | 0.03 | 0.12 | 0.24 |
| 3-9 | 0.07 | 0.27 | 0.03 | 0.12 | 0.23 |
| 3-10 | 0.07 | 0.27 | 0.03 | 0.12 | 0.23 |
| 3-11 | 0.06 | 0.27 | 0.03 | 0.12 | 0.23 |
| 3-12 | 0.07 | 0.27 | 0.03 | 0.12 | 0.23 |
| 3-13 | 0.06 | 0.27 | 0.02 | 0.12 | 0.23 |

EXAMPLES 4-1 TO 4-13

In each anti-reflection coating 20 according to the first embodiment, which comprised high-refractive-index layers 22, 24, 26 and 28 made of TiO$_2$ having a refractive index of 2.30 to the d-line, intermediate-refractive-index layers 21, 23, 25 and 27 made of a mixture of Al$_2$O$_3$ and SiO$_2$ having a refractive index of 1.54 to the d-line, and a low-refractive-index layer 29 made of MgF$_2$ having a refractive index of 1.39 to the d-line, with air having a refractive index of 1.00 as an incident-side medium, the optimum optical thickness of each layer 21-29 for each substrate 10 was calculated by simulation. The material and refractive index of the substrate 10 and the optical thickness of each layer in the anti-reflection coatings 20 in each Example 4-1 to 4-13 are shown in Table 4. The spectral reflectance of each anti-reflection coating 20 of Examples 4-1 to 4-13 to perpendicular incident light was calculated by simulation. The calculation results are shown in FIGS. 43-55.

TABLE 4

| | | | Optical Thickness (×λ₀) of Each Layer | | | |
|---|---|---|---|---|---|---|
| | Substrate | | 1st Layer | | 3rd Layer | |
| Examples | Material | Refractive Index | Al$_2$O$_3$ + SiO$_2$ | 2nd Layer TiO$_2$ | Al$_2$O$_3$ + SiO$_2$ | 4th Layer TiO$_2$ |
| 4-1 | FK03 | 1.44 | 0.31 | 0.02 | 0.57 | 0.07 |
| 4-2 | FK5 | 1.49 | 0.31 | 0.02 | 0.57 | 0.07 |
| 4-3 | BK7 | 1.52 | 0.3 | 0.01 | 0.57 | 0.07 |
| 4-4 | SK20 | 1.56 | 0.55 | 0.01 | 0.57 | 0.06 |
| 4-5 | SK14 | 1.60 | 0.02 | 0.01 | 0.54 | 0.07 |
| 4-6 | LAK7 | 1.65 | 0.01 | 0.01 | 0.52 | 0.07 |
| 4-7 | LAK10 | 1.72 | 0.06 | 0.01 | 0.43 | 0.07 |
| 4-8 | LASF016 | 1.77 | 0.07 | 0.01 | 0.43 | 0.07 |
| 4-9 | LASF04 | 1.82 | 0.07 | 0.02 | 0.43 | 0.07 |
| 4-10 | SFL03 | 1.85 | 0.07 | 0.02 | 0.43 | 0.07 |
| 4-11 | LASF08 | 1.88 | 0.07 | 0.03 | 0.42 | 0.07 |
| 4-12 | NPH2 | 1.92 | 0.07 | 0.03 | 0.44 | 0.07 |
| 4-13 | TAFD40 | 2.00 | 0.07 | 0.04 | 0.44 | 0.06 |

| | Optical Thickness (×λ₀) of Each Layer | | | | |
|---|---|---|---|---|---|
| Examples | 5th Layer Al$_2$O$_3$ + SiO$_2$ | 6th Layer TiO$_2$ | 7th Layer Al$_2$O$_3$ + SiO$_2$ | 8th Layer TiO$_2$ | 9th Layer MgF$_2$ |
| 4-1 | 0.07 | 0.3 | 0.04 | 0.1 | 0.24 |
| 4-2 | 0.07 | 0.33 | 0.04 | 0.09 | 0.24 |
| 4-3 | 0.07 | 0.36 | 0.04 | 0.08 | 0.23 |
| 4-4 | 0.07 | 0.37 | 0.04 | 0.08 | 0.23 |
| 4-5 | 0.07 | 0.35 | 0.04 | 0.09 | 0.23 |
| 4-6 | 0.07 | 0.32 | 0.04 | 0.09 | 0.23 |
| 4-7 | 0.07 | 0.27 | 0.04 | 0.1 | 0.24 |
| 4-8 | 0.07 | 0.27 | 0.04 | 0.11 | 0.24 |
| 4-9 | 0.07 | 0.27 | 0.04 | 0.1 | 0.24 |
| 4-10 | 0.07 | 0.27 | 0.04 | 0.1 | 0.24 |
| 4-11 | 0.06 | 0.27 | 0.04 | 0.1 | 0.23 |
| 4-12 | 0.06 | 0.27 | 0.04 | 0.1 | 0.24 |
| 4-13 | 0.06 | 0.27 | 0.04 | 0.1 | 0.23 |

Figure 4:
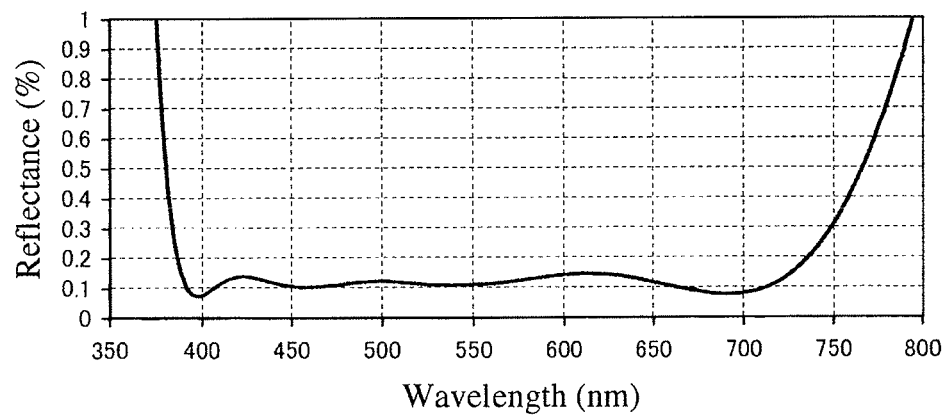
FIGS. 4-16 are graphs each showing the spectral characteristics of reflectance of the anti-reflection coating of each Example 1-1 to 1-13.
Figure 5:
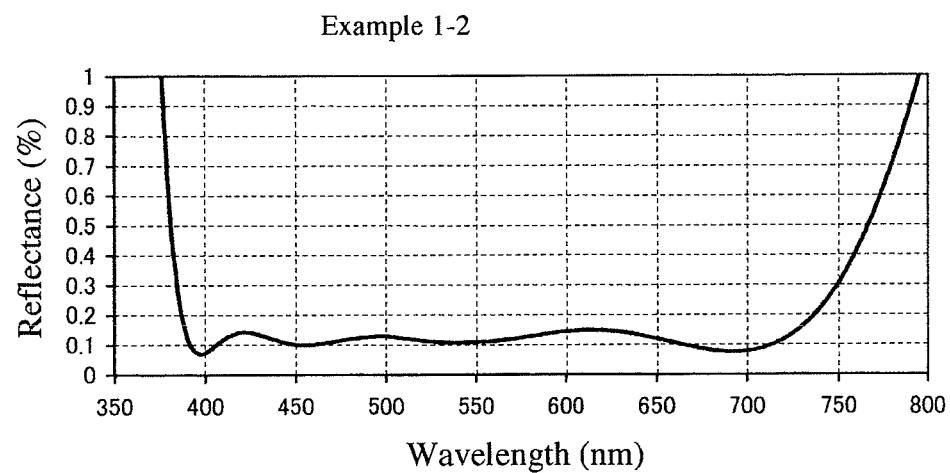
Figure 6:
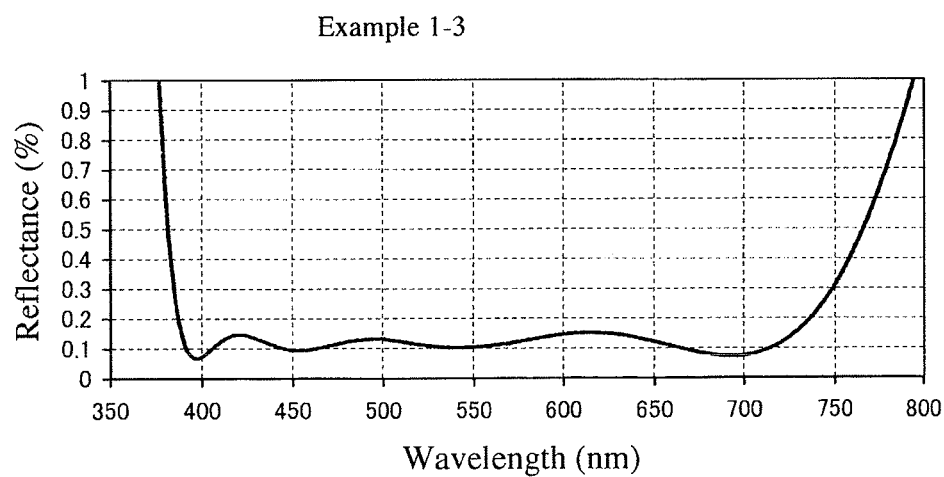
Figure 7:
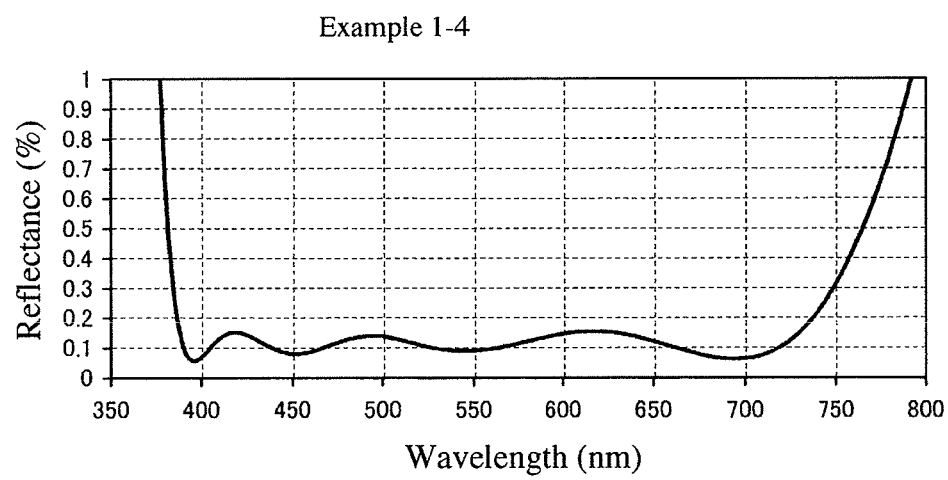
Figure 8:
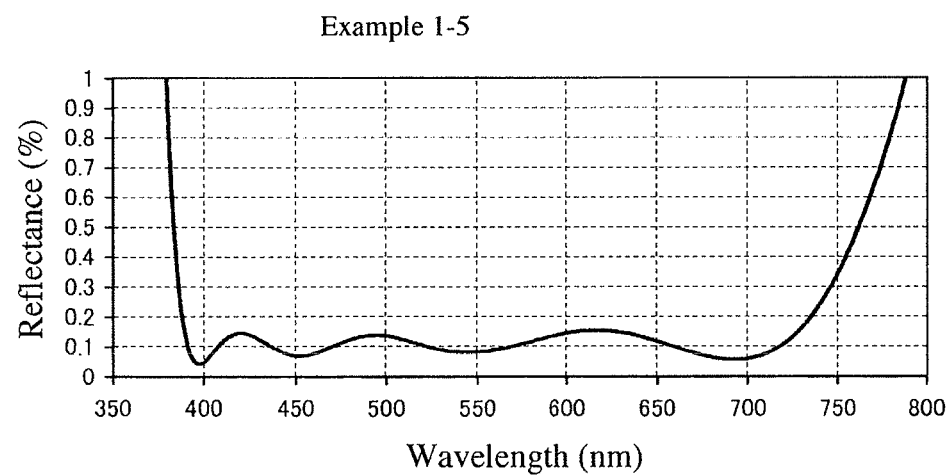
Figure 9:
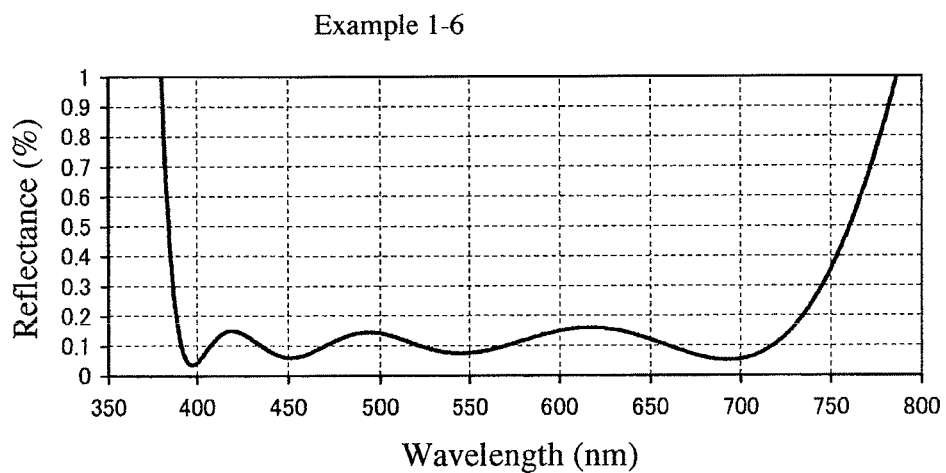
Figure 10:
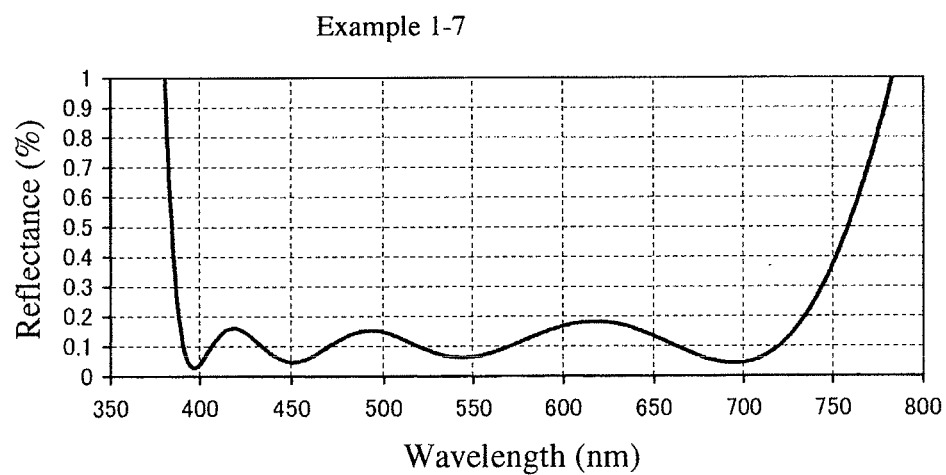
Figure 11:
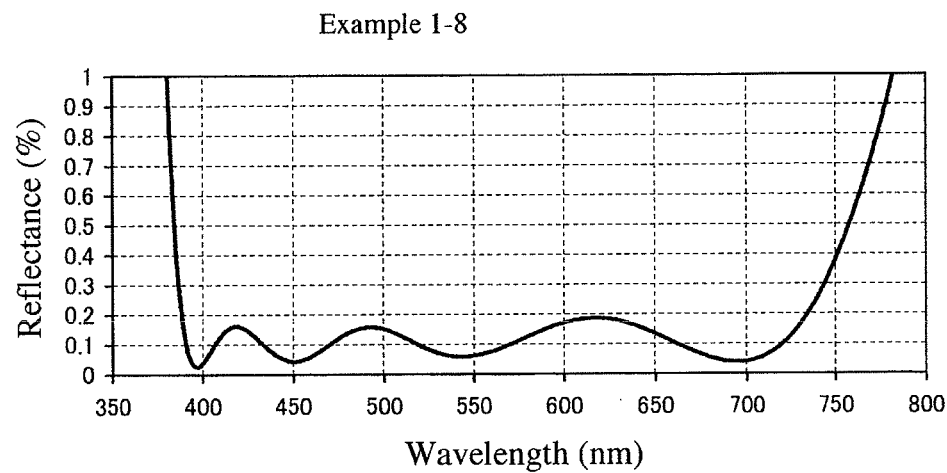
Figure 12:
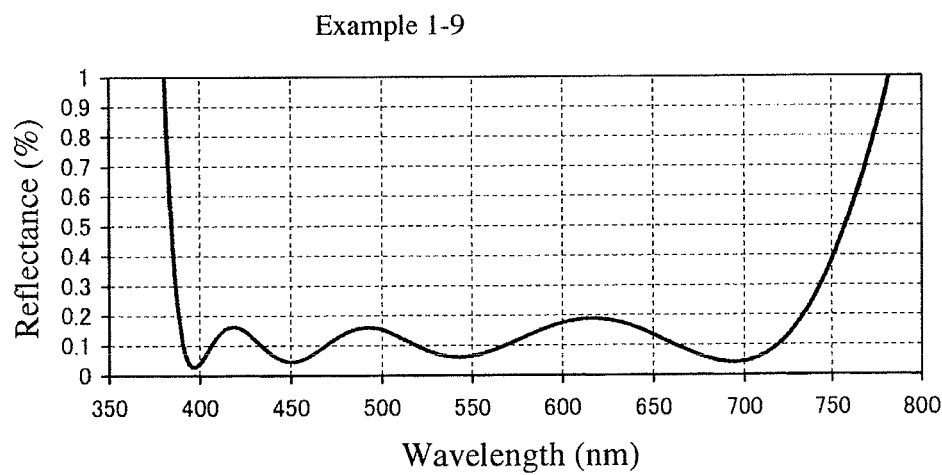
Figure 13:
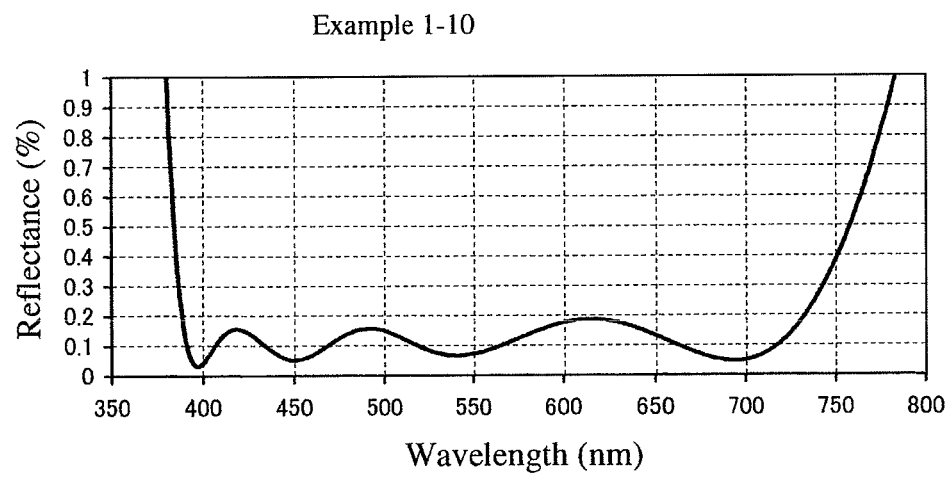
Figure 14:
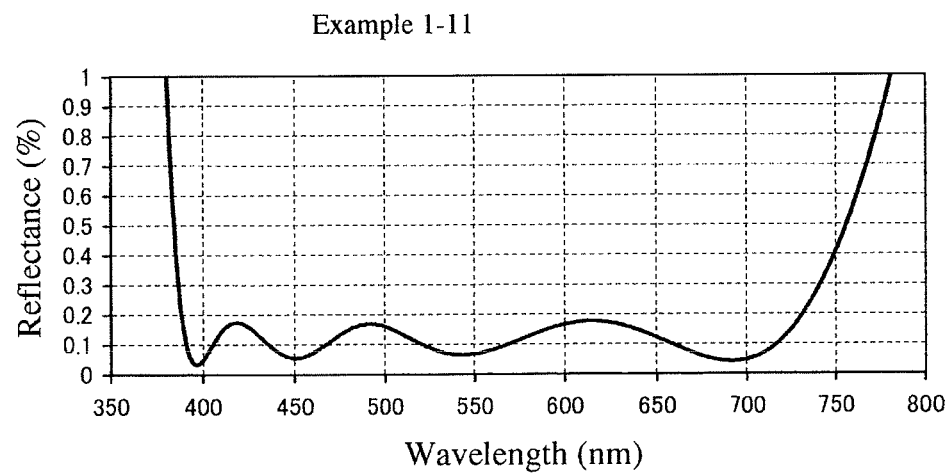
Figure 15:
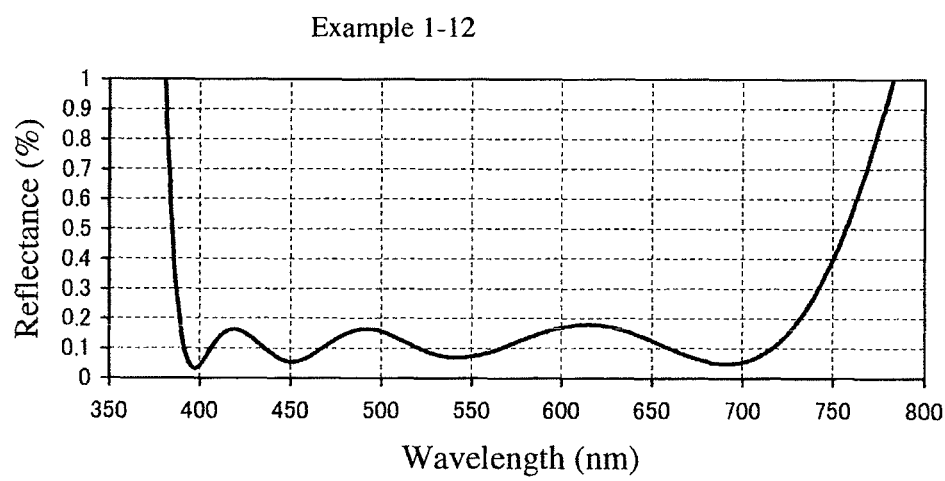
Figure 16:
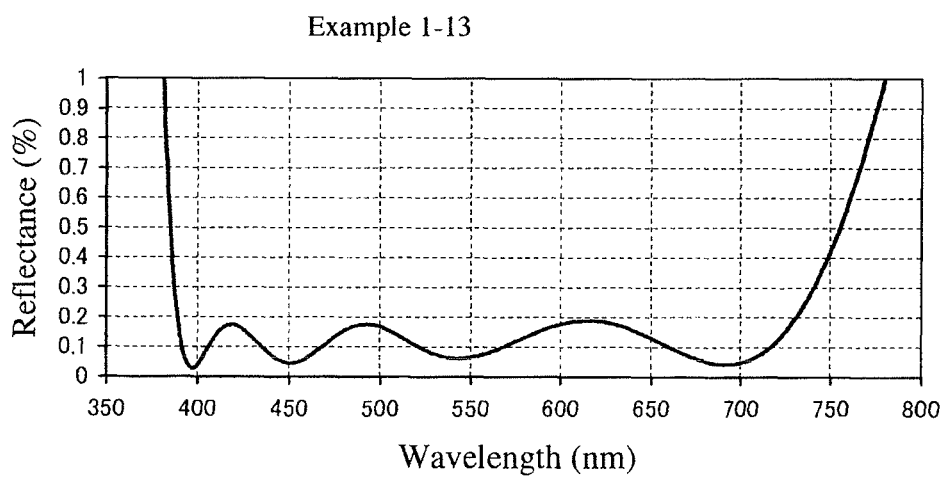
Figure 17:
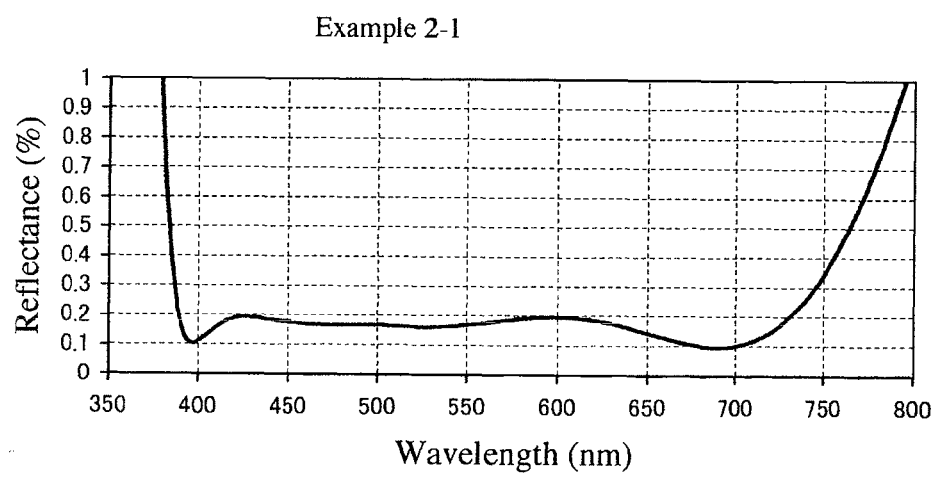
FIGS. 17-29 are graphs each showing the spectral characteristics of reflectance of the anti-reflection coating of each Example 2-1 to 2-13.
Figure 18:
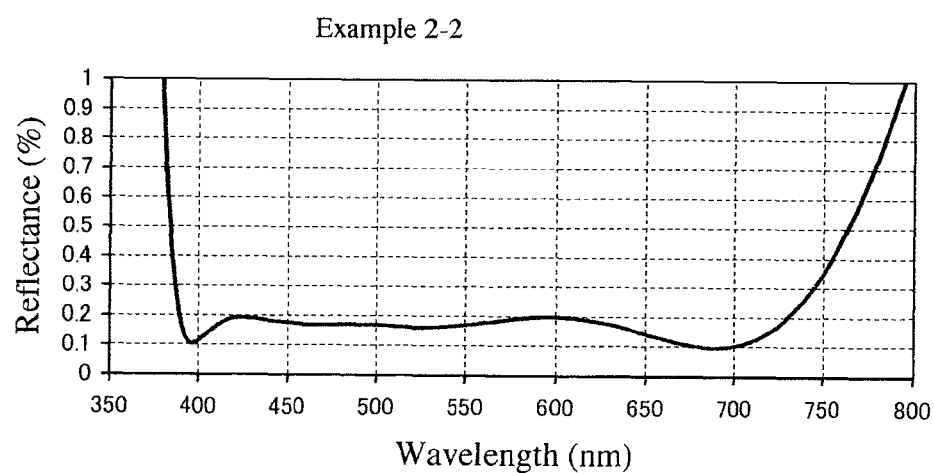
Figure 19:
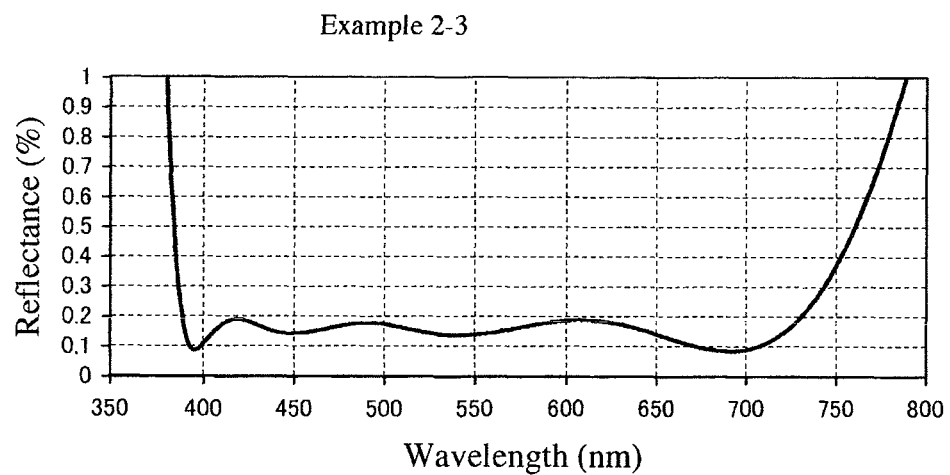
Figure 20:
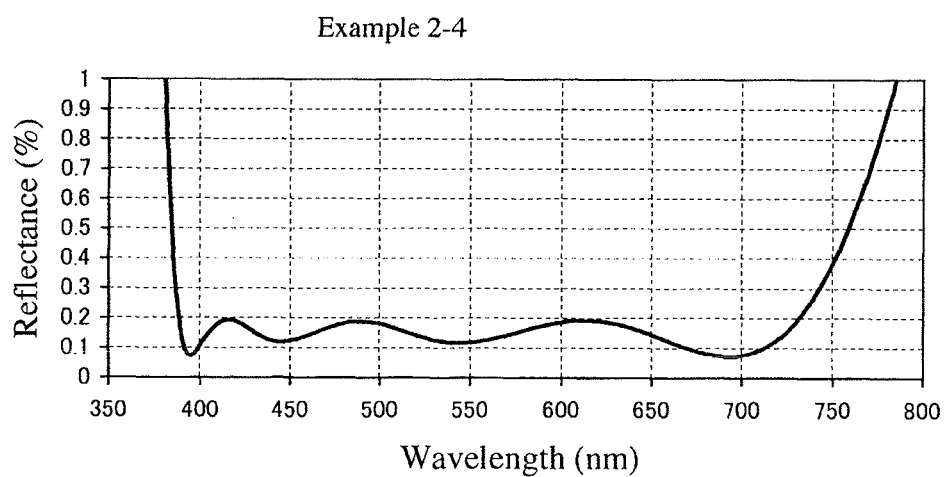
Figure 21:
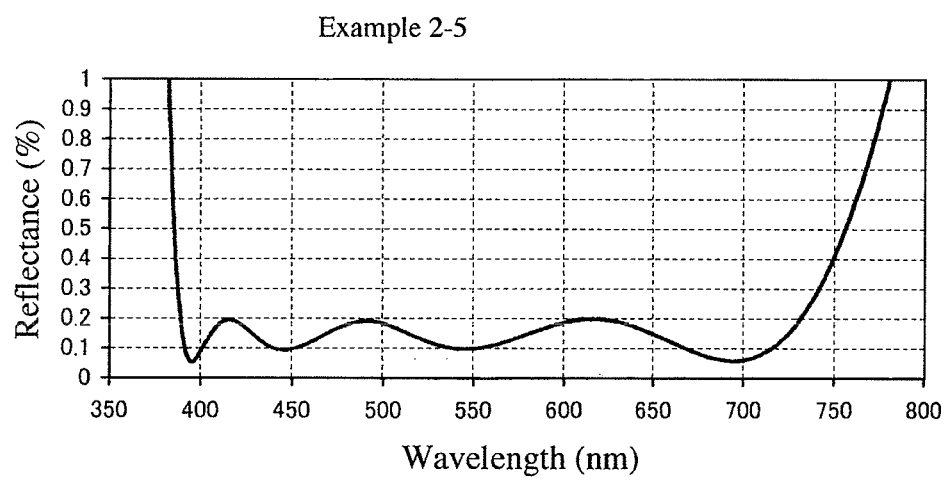
Figure 22:
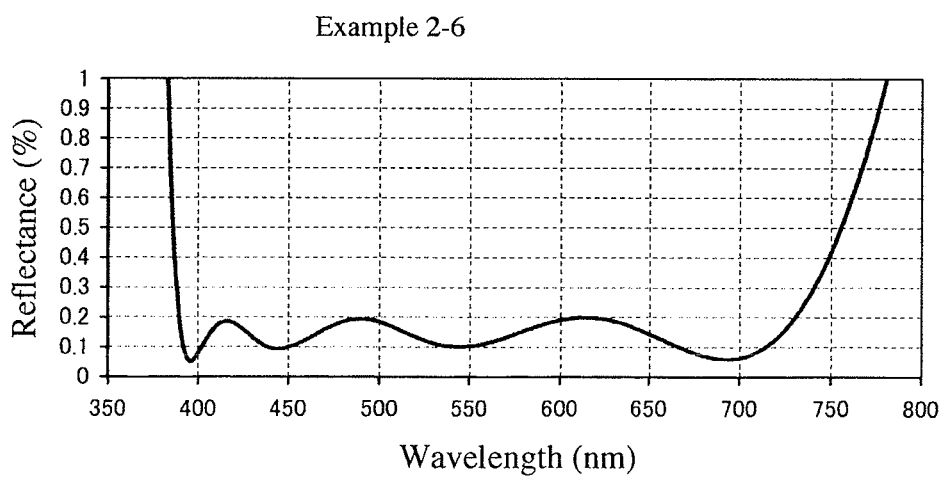
Figure 23:
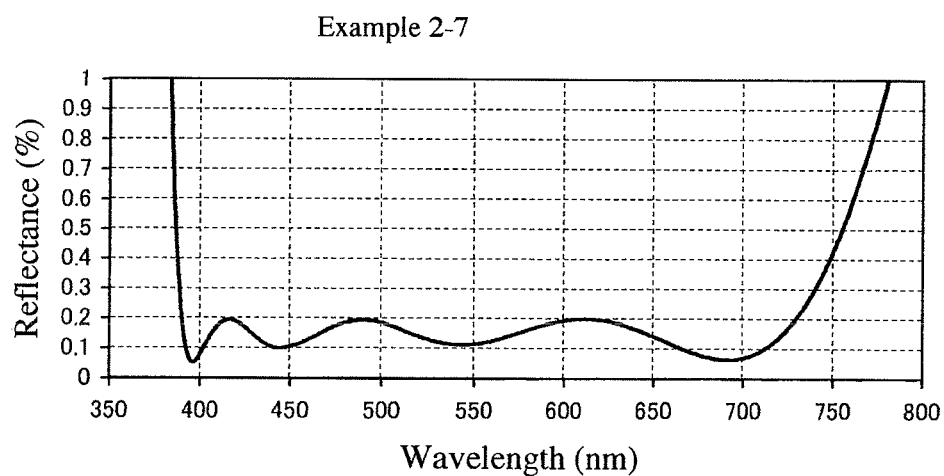
Figure 24:
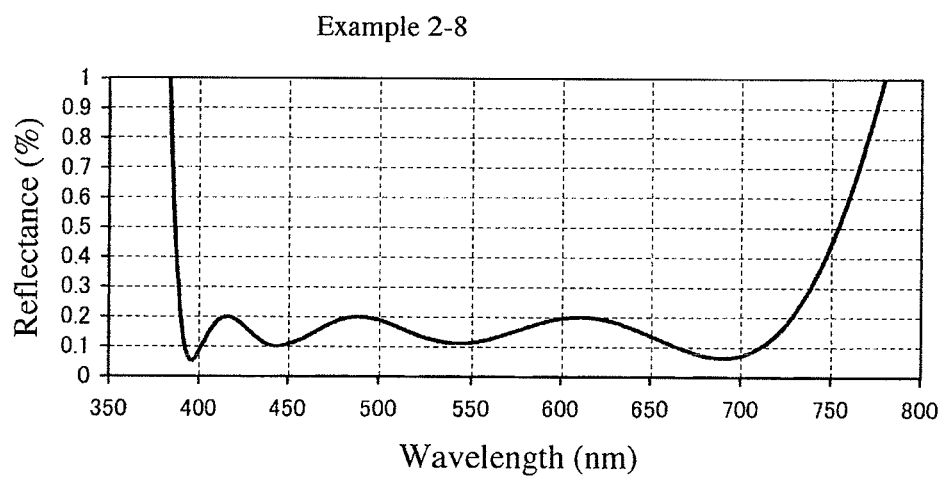
Figure 25:
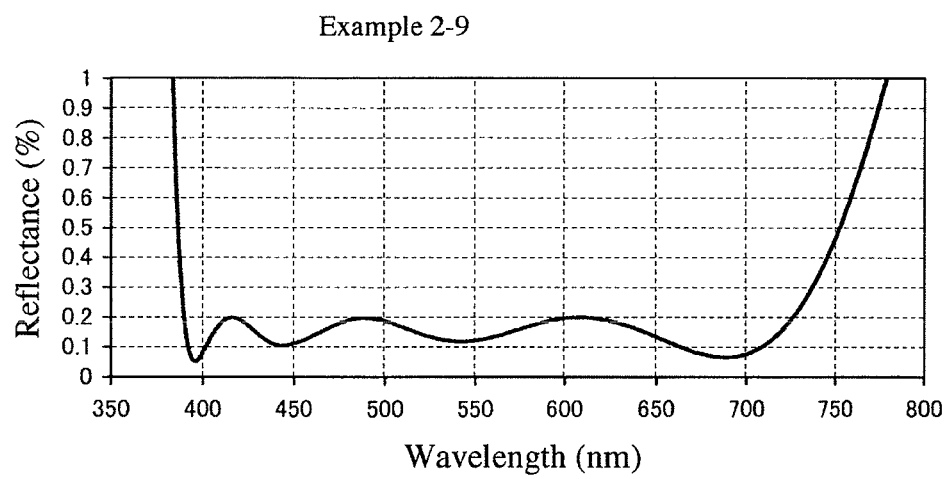
Figure 26:
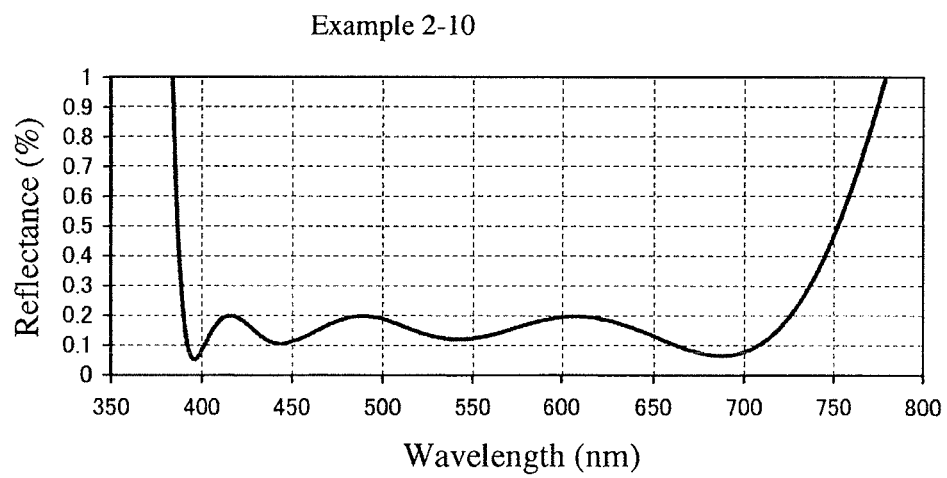
Figure 27:
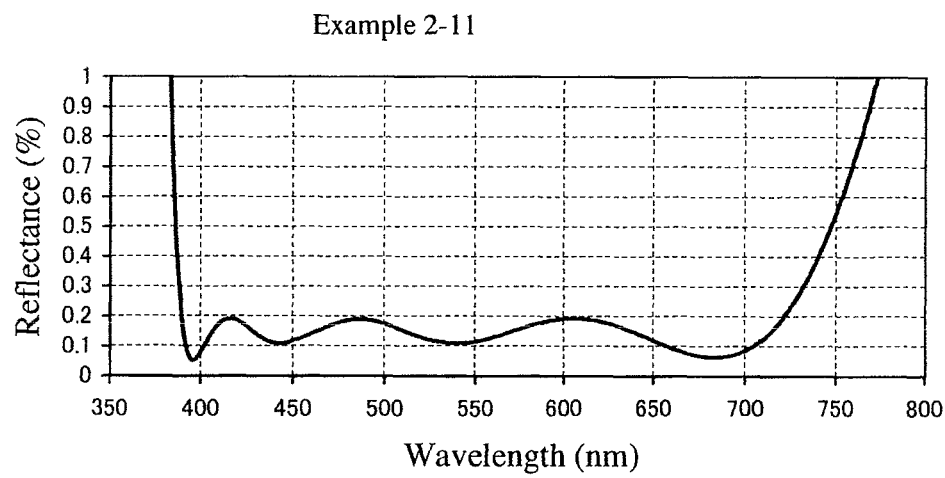
Figure 28:
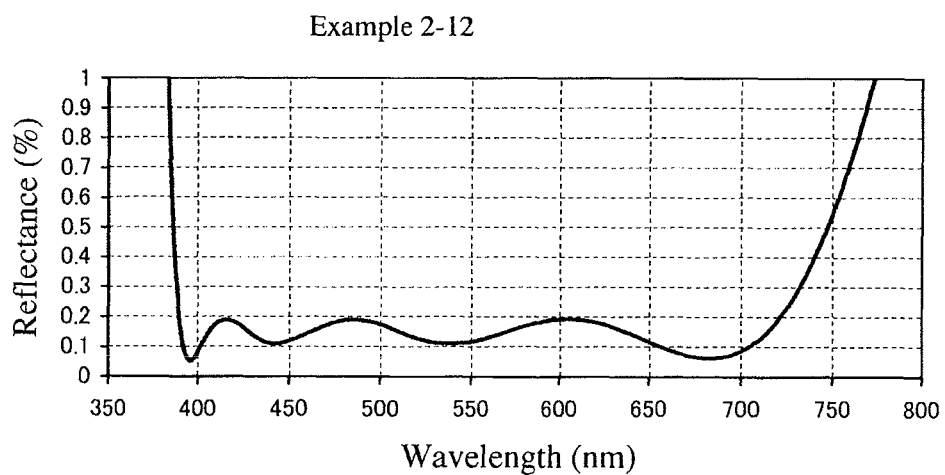
Figure 29:
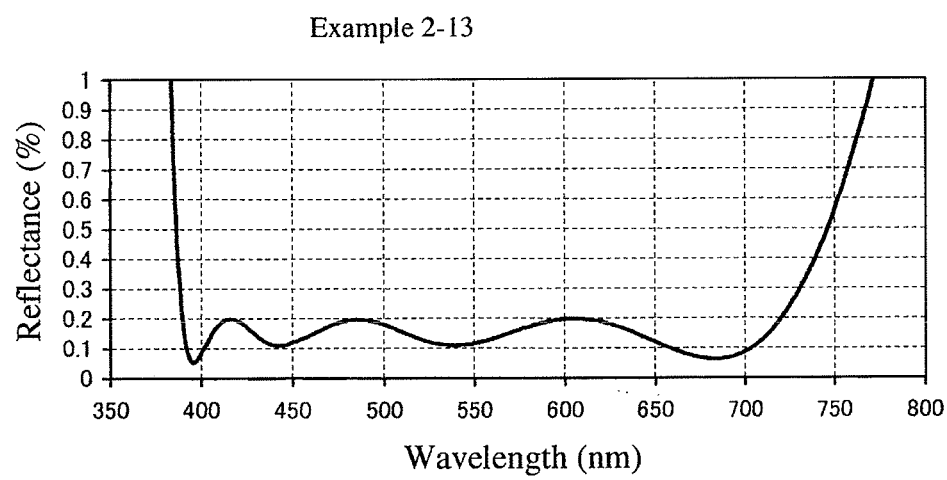
Figure 30:
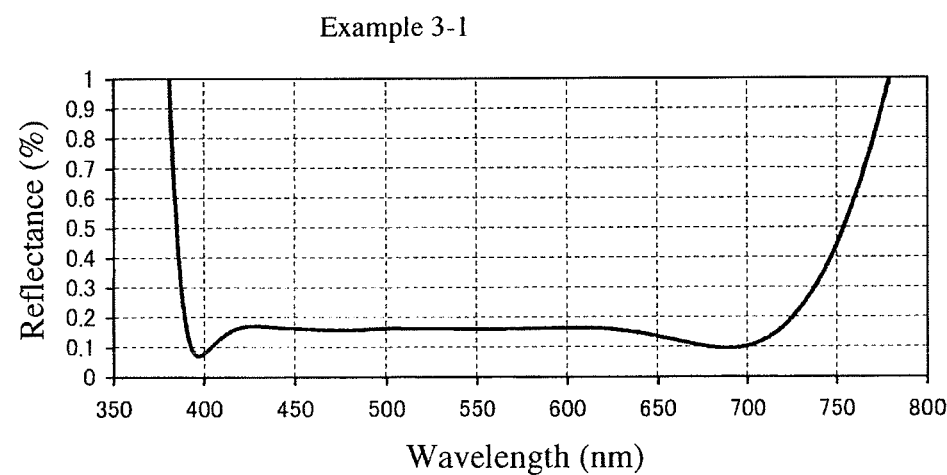
FIGS. 30-42 are graphs each showing the spectral characteristics of reflectance of the anti-reflection coating of each Example 3-1 to 3-13.
Figure 31:
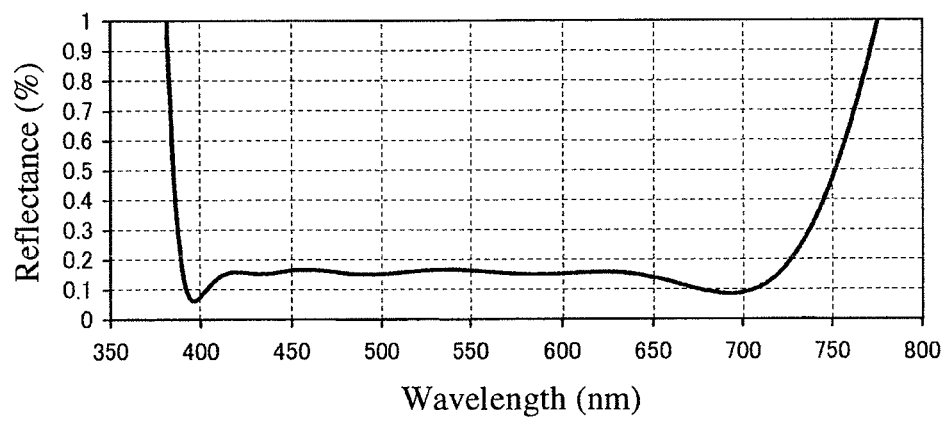
Figure 32:
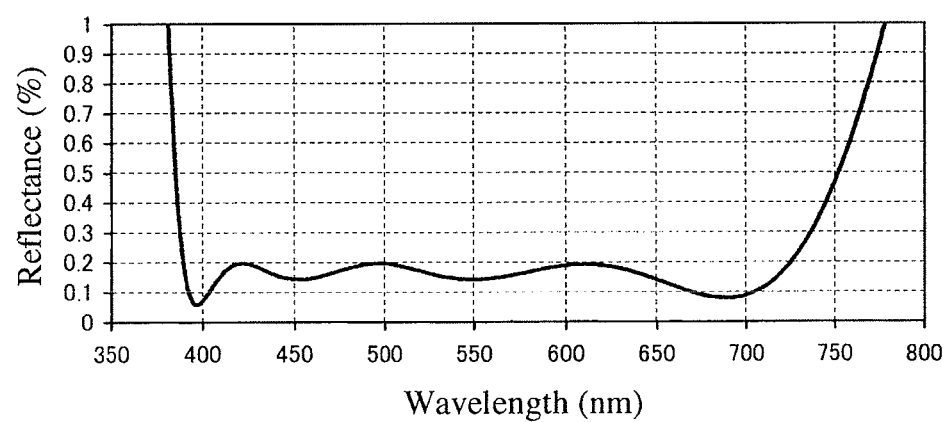
Figure 33:
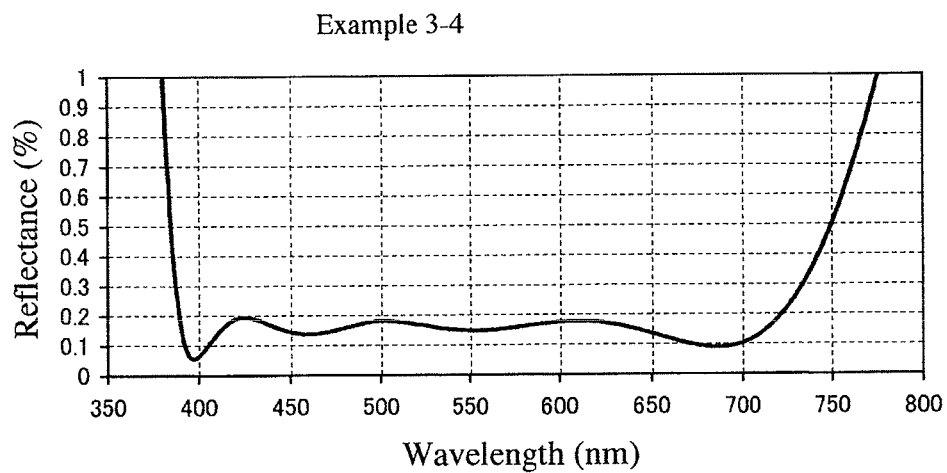
Figure 34:
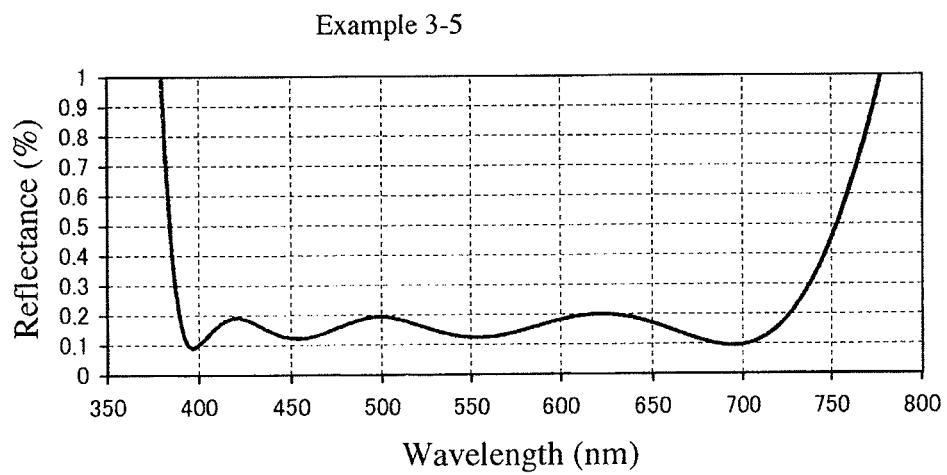
Figure 35:
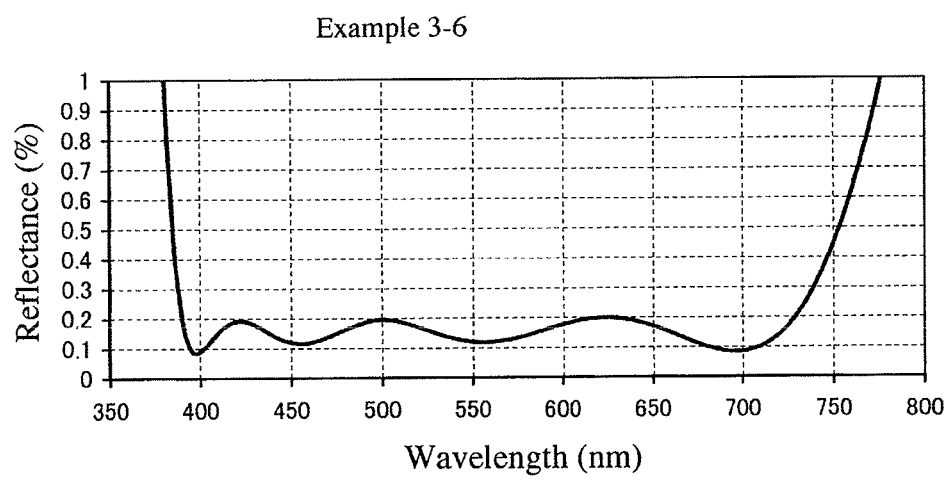
Figure 36:
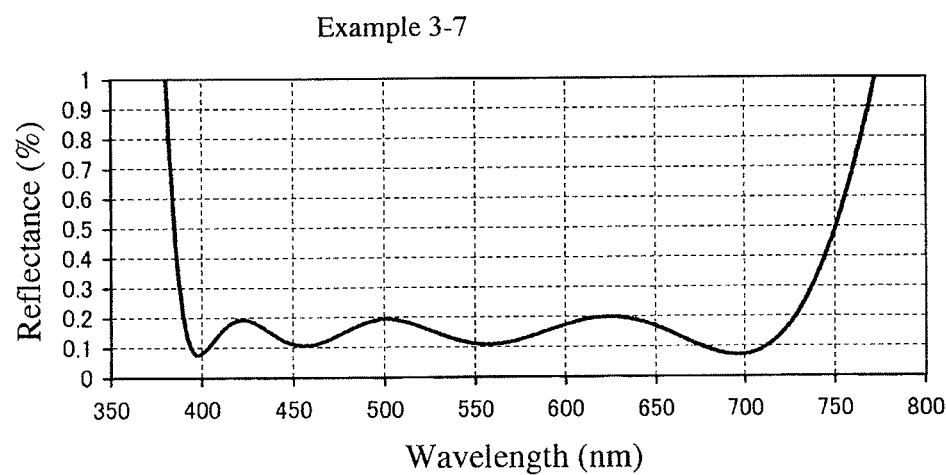
Figure 37:
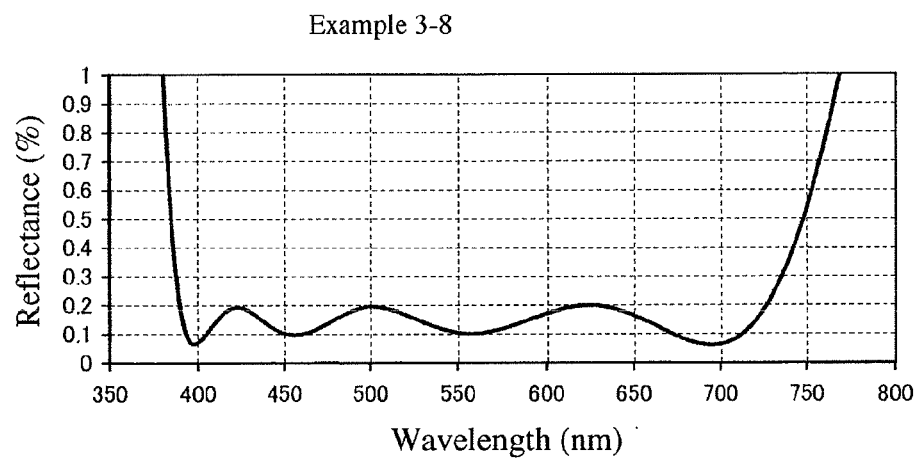
Figure 38:
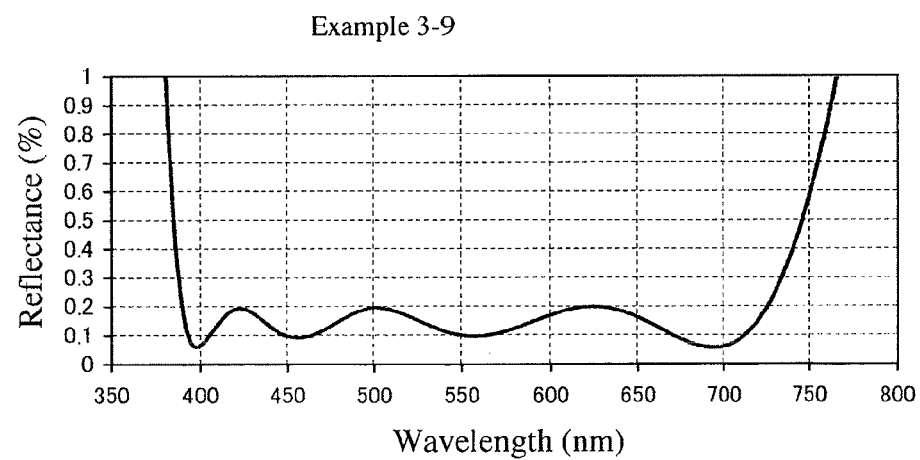
Figure 39:
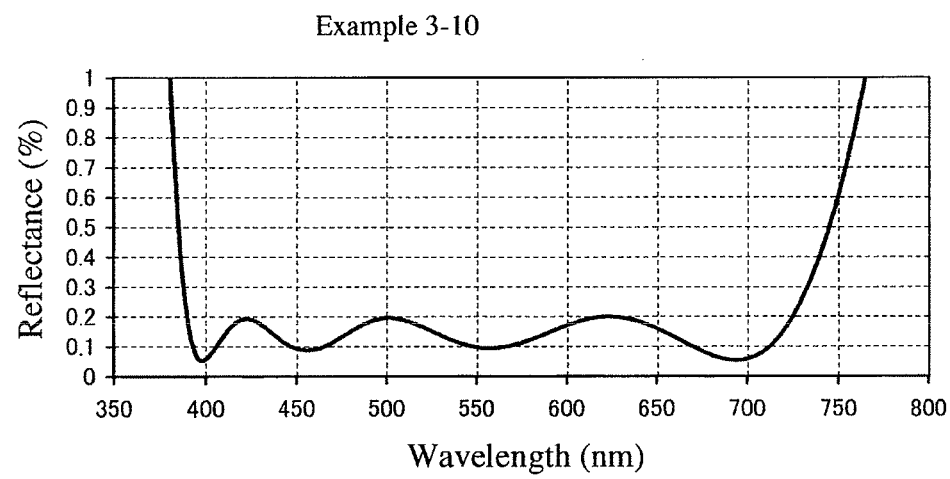
Figure 40:
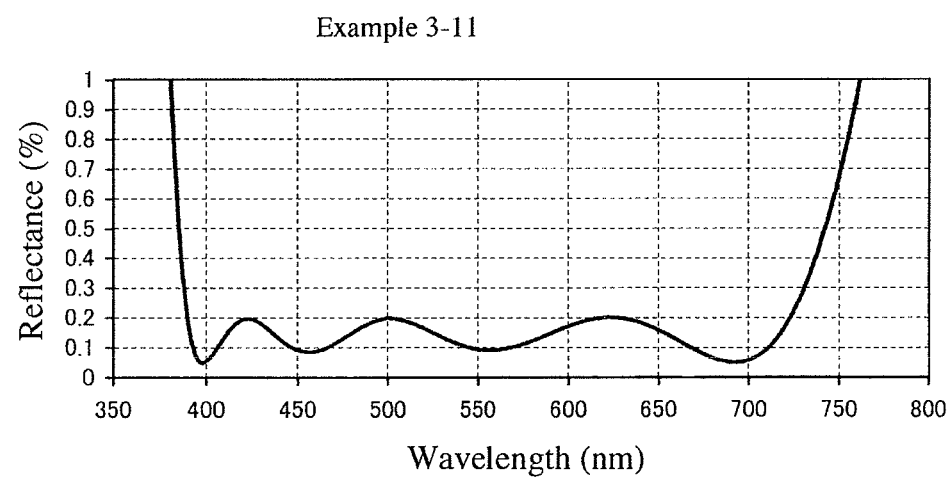
Figure 41:
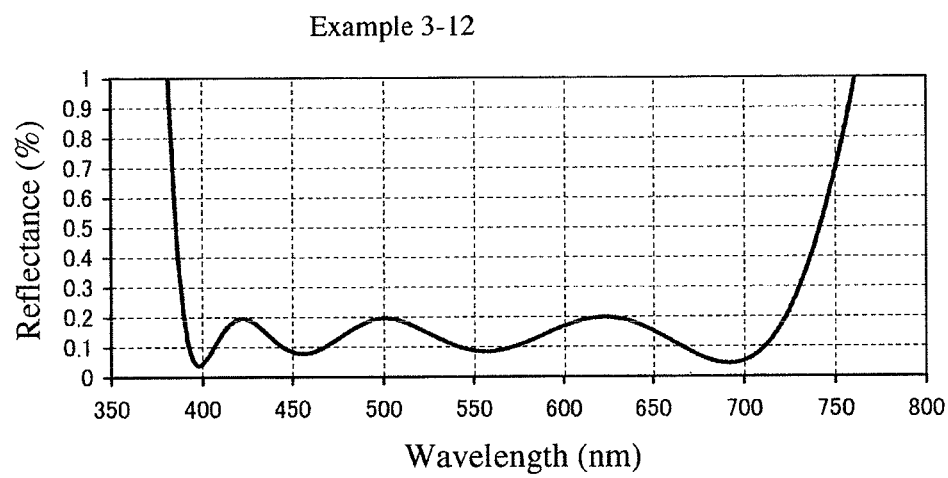
Figure 42:
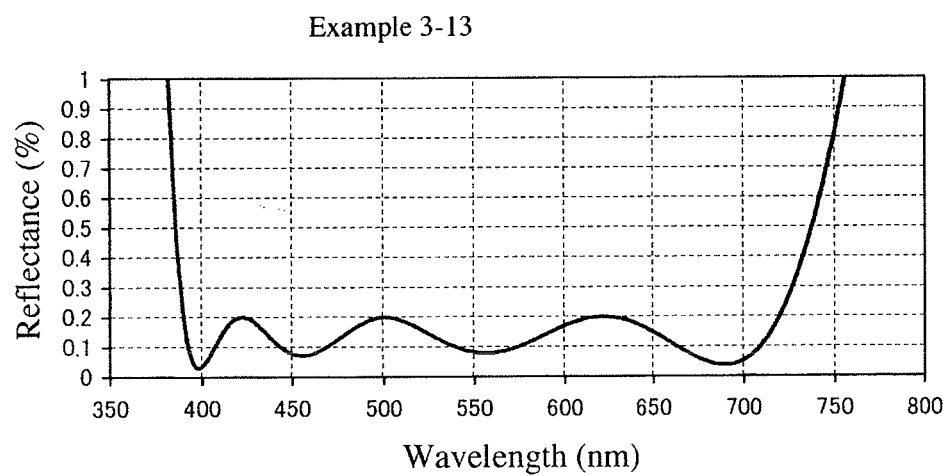
Figure 43:
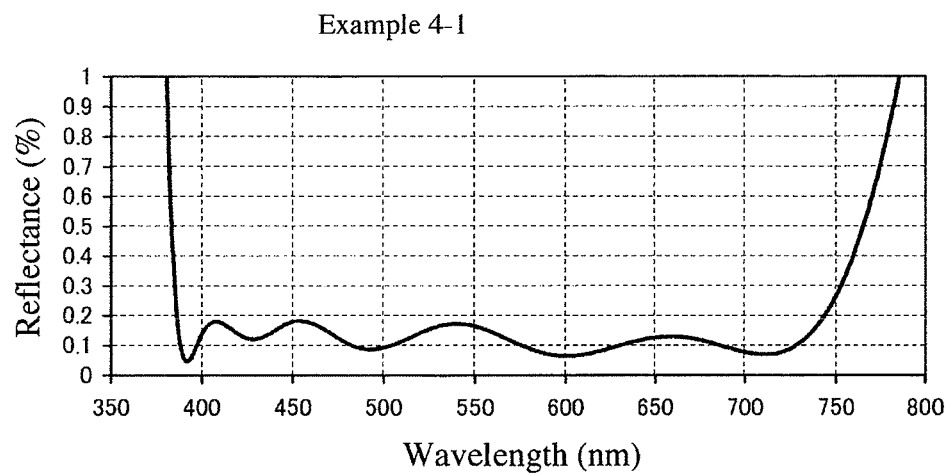
FIGS. 43-55 are graphs each showing the spectral characteristics of reflectance of the anti-reflection coating of each Example 4-1 to 4-13.
Figure 44:
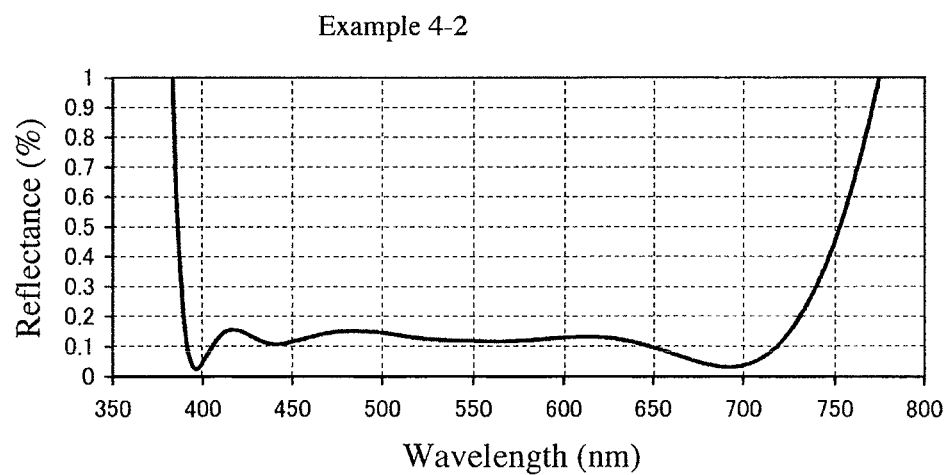
Figure 45:
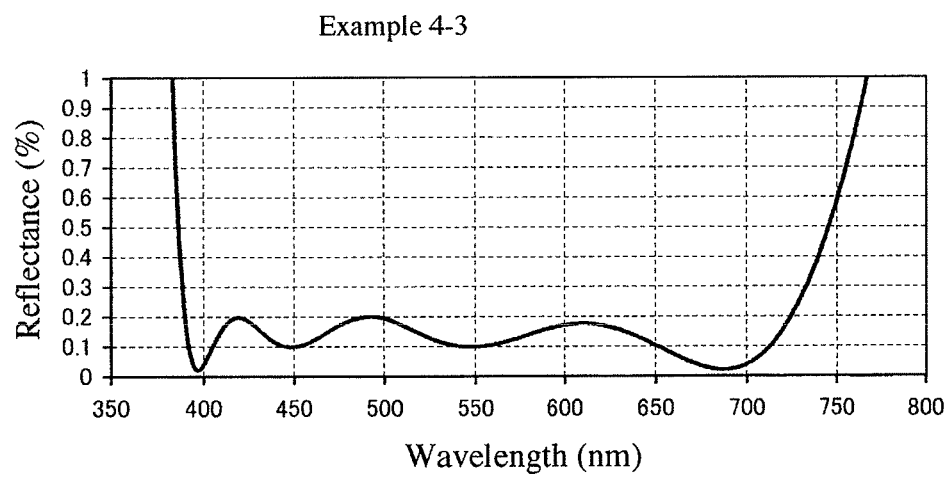
Figure 46:
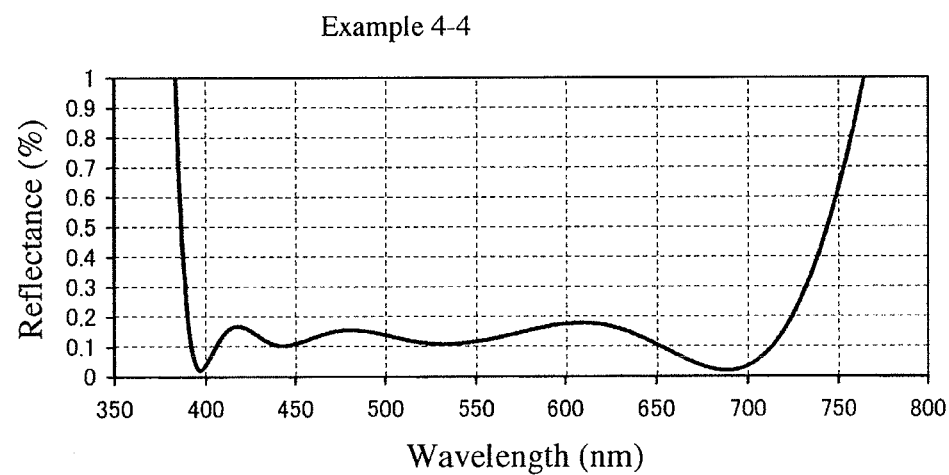
Figure 47:
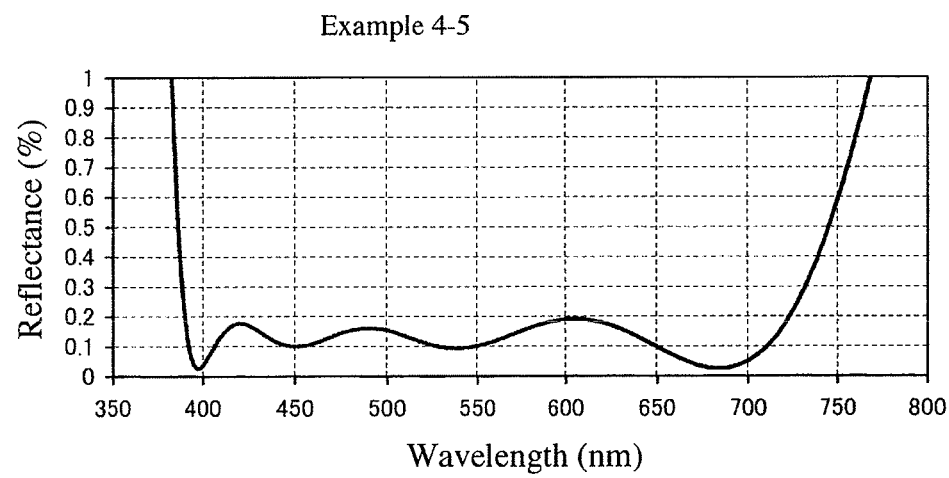
Figure 48:
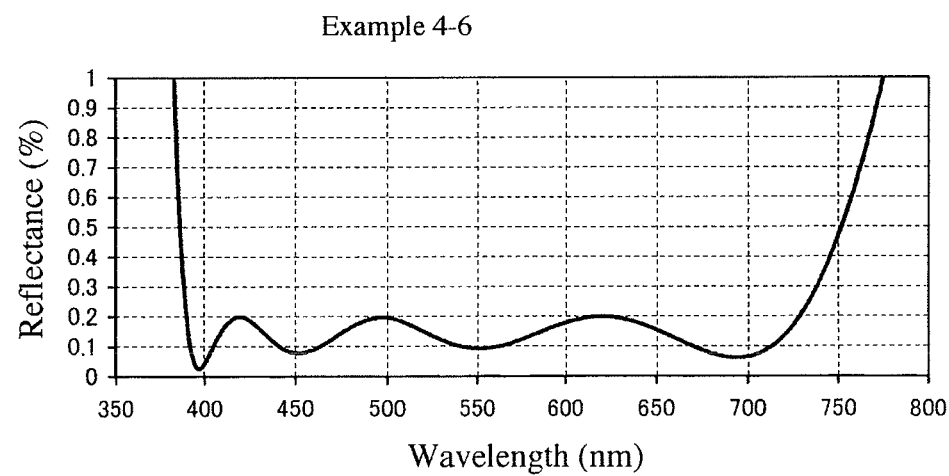
Figure 49:
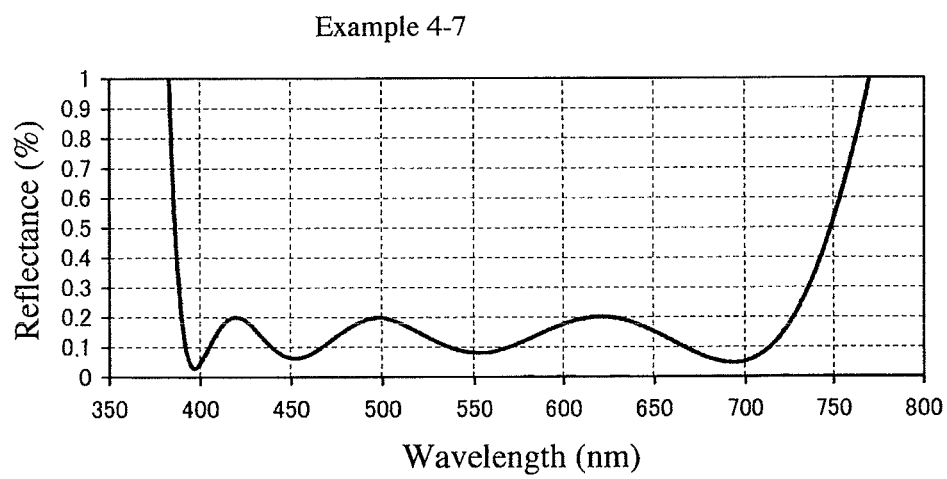
Figure 50:
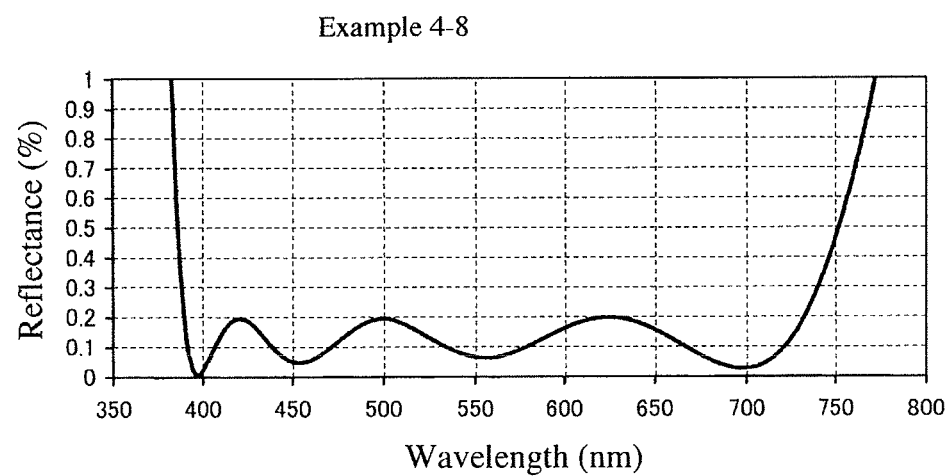
Figure 51:
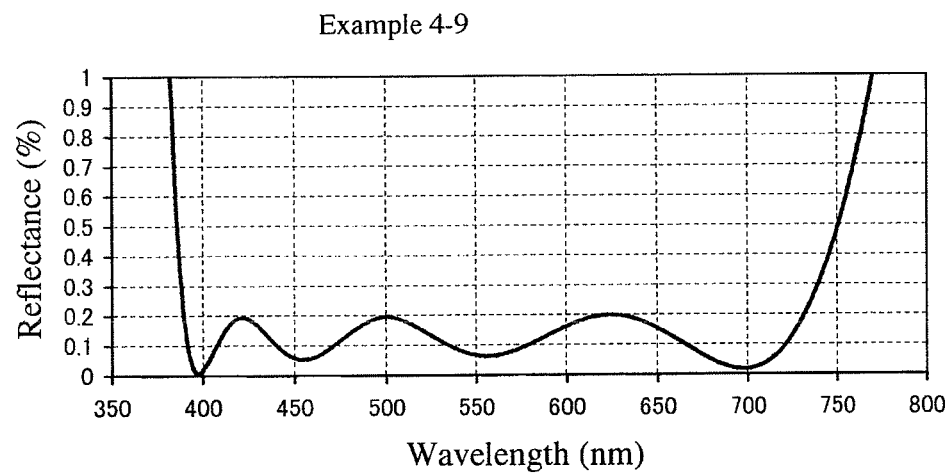
Figure 52:
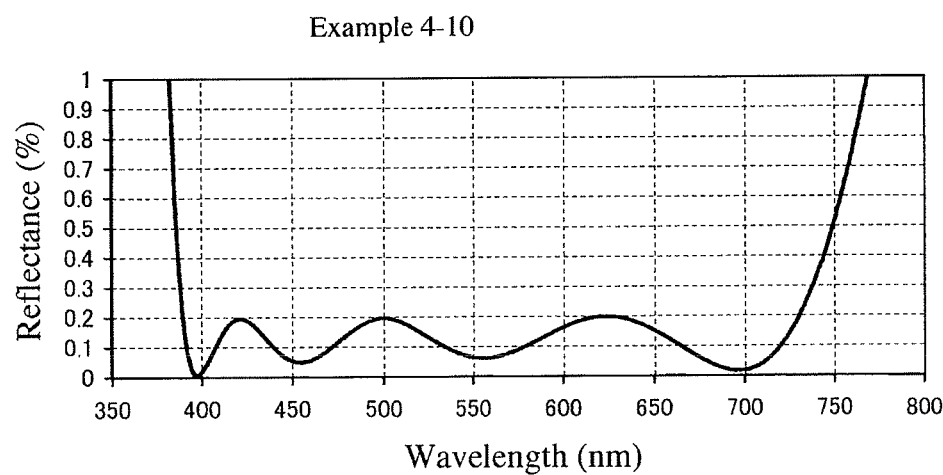
Figure 53:
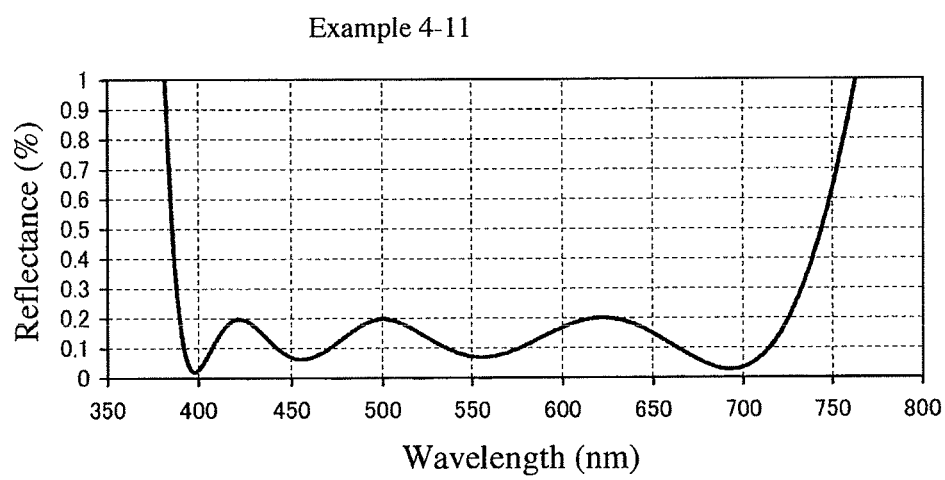
Figure 54:
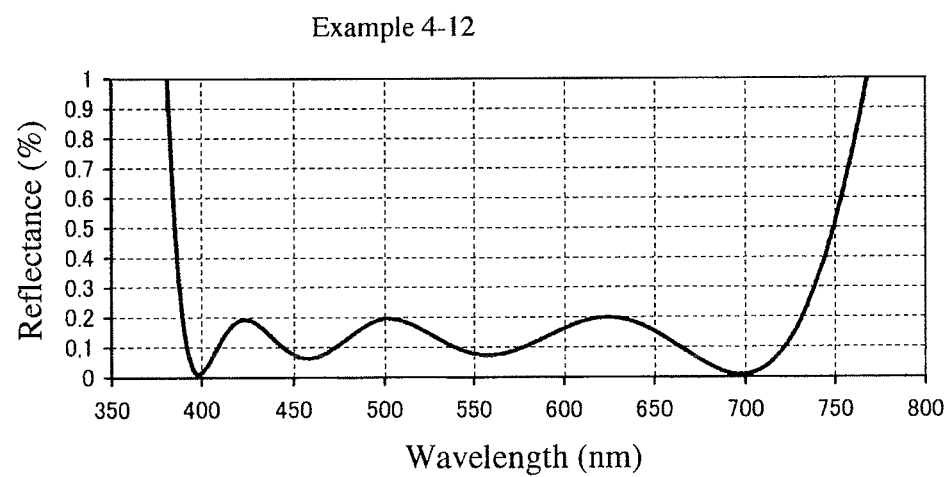
Figure 55:
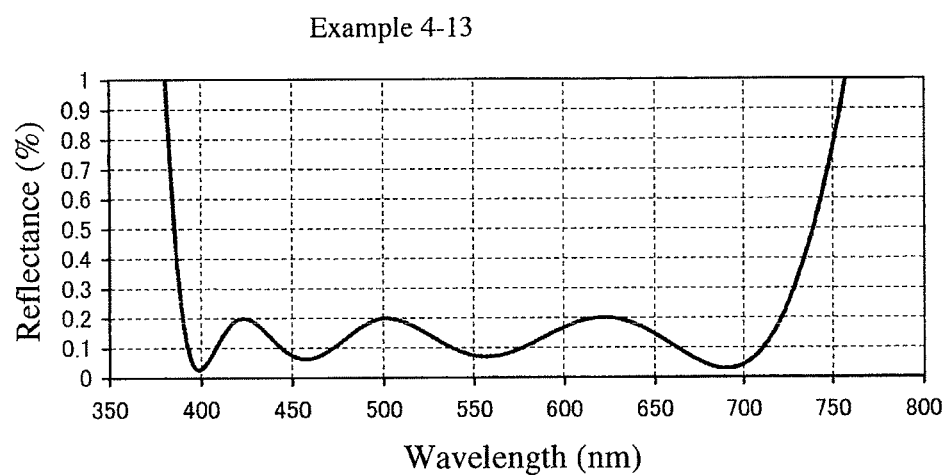

As is clear from FIGS. 4-55, the resultant anti-reflection coatings had the maximum reflectance of 0.2% or less in a wavelength bandwidth of 330 nm between 390 nm and 720 nm. This indicates that the anti-reflection coating according to the first embodiment of the present invention has sufficiently reduced reflectance in a wide wavelength range with a small number of lamination, thereby suppressing problems such as flare and ghost, which extremely deteriorate the optical characteristics, to obtain excellent color balance.

COMPARATIVE EXAMPLE 1

Figure 56:
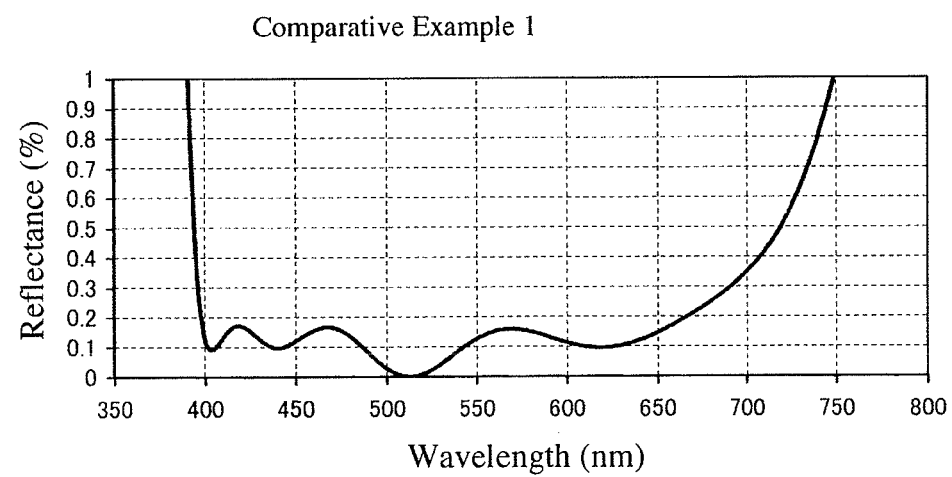
FIG. 56 is a graph showing the spectral characteristics of reflectance of the anti-reflection coating of Comparative Example 1.
Figure 57:
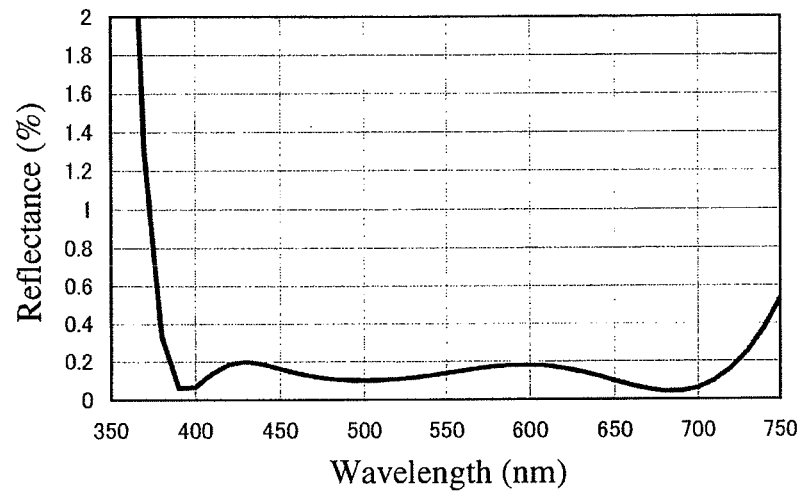
FIGS. 57-68 are graphs each showing the spectral characteristics of reflectance of the anti-reflection coating of each Example 5-1 to 5-12.
Figure 58:
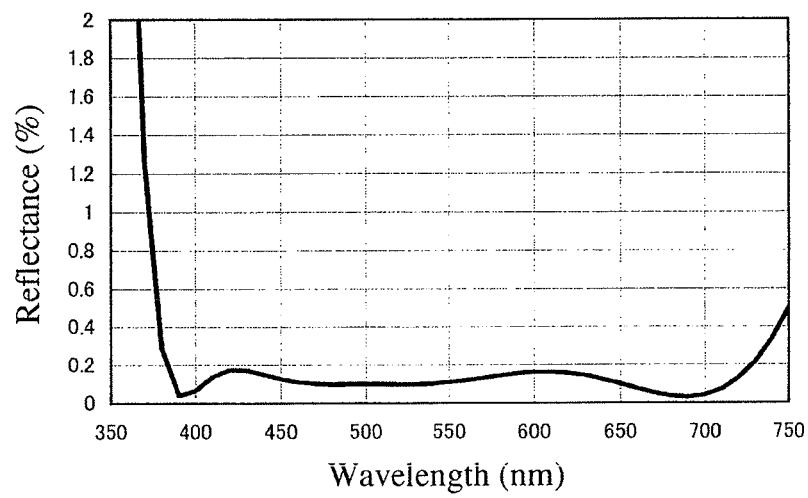
Figure 59:
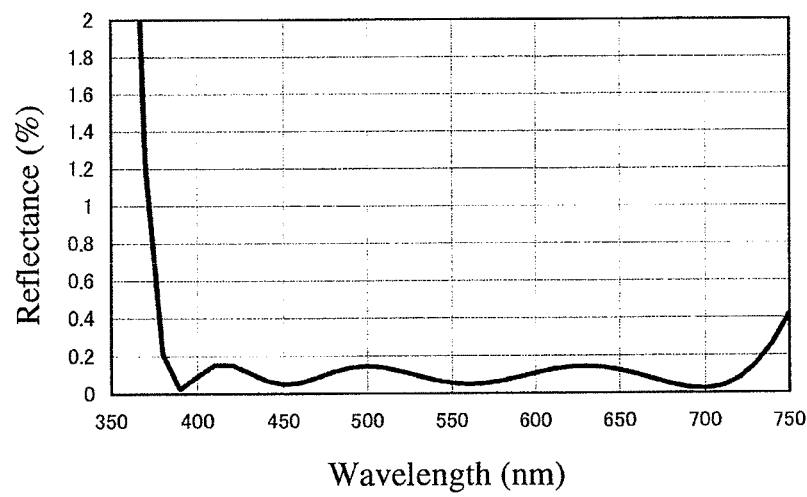
Figure 60:
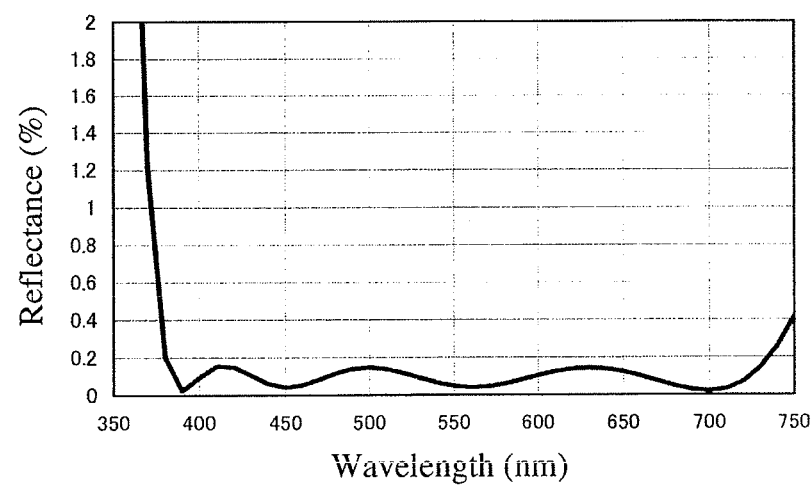
Figure 61:
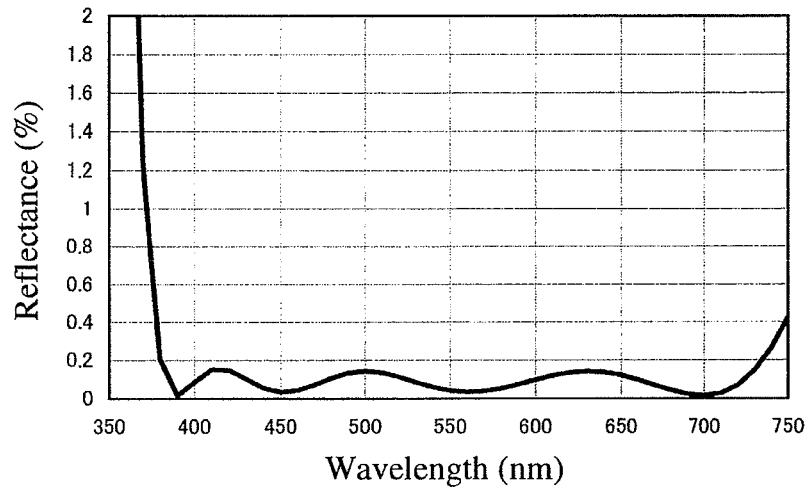
Figure 62:
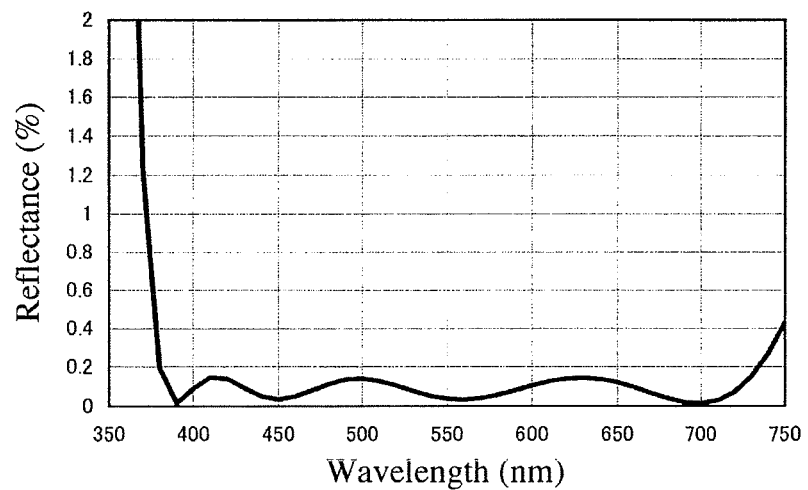
Figure 63:
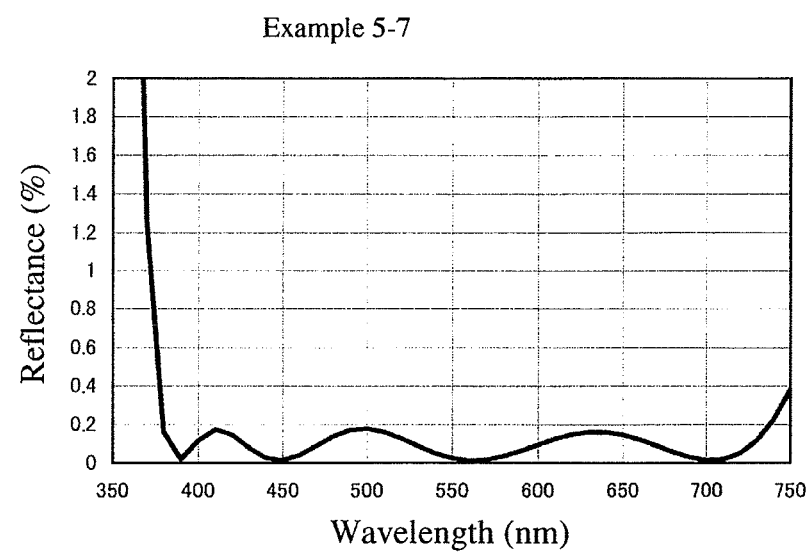
Figure 64:
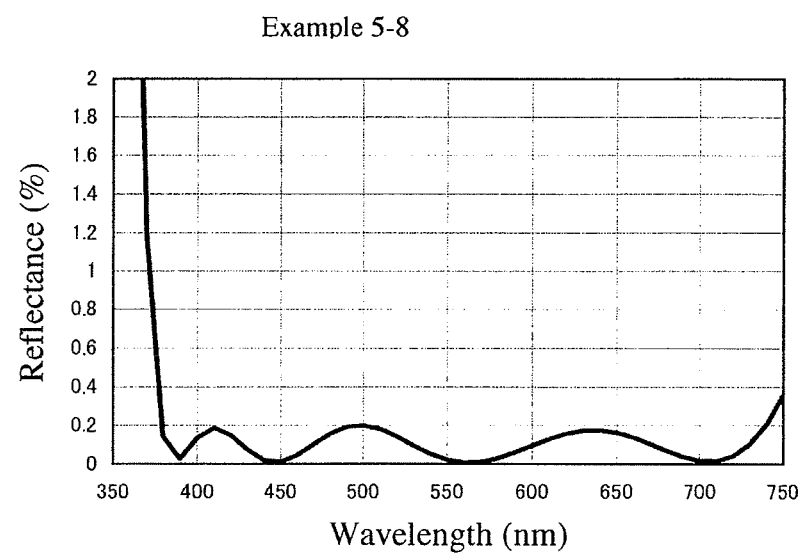

In an anti-reflection coating 20 formed on a substrate 10 made of BSL7 having a refractive index of 1.52, which comprised high-refractive-index layers 22, 24, 26 and 28 made of $ZrO_2+TiO_2$ having a refractive index of 2.11 to light in a wavelength of 550 nm, intermediate-refractive-index layers 21, 23, 25 and 27 made of $Al_2O_3$ having a refractive index of 1.62 to light in a wavelength of 550 nm, and a low-refractive-index layer 29 made of $MgF_2$ having a refractive index of 1.38 to light in a wavelength of 550 nm, with air having a refractive index of 1.00 as an incident-side medium, the optimum optical thickness of each layer 21-29 for the substrate 10 was calculated by simulation. The optical thickness of each layer in the anti-reflection coating 20 is shown in Table 5. The spectral reflectance of the anti-reflection coating 20 to perpendicular incident light was calculated by simulation. The calculation results are shown in FIG. 56.

TABLE 5

| Layer | Material | Optical Thickness (×$\lambda_0$) |
|---|---|---|
| Substrate | BSL7 | — |
| 1st Layer | $Al_2O_3$ | 0.167 |

TABLE 5-continued

| Layer | Material | Optical Thickness (×$\lambda_0$) |
|---|---|---|
| 2nd Layer | $ZrO_2 + TiO_2$ | 0.035 |
| 3rd Layer | $Al_2O_3$ | 0.097 |
| 4th Layer | $ZrO_2 + TiO_2$ | 0.17 |
| 5th Layer | $Al_2O_3$ | 0.054 |
| 6th Layer | $ZrO_2 + TiO_2$ | 0.157 |
| 7th Layer | $Al_2O_3$ | 0.486 |
| 8th Layer | $ZrO_2 + TiO_2$ | 0.450 |
| 9th Layer | $MgF_2$ | 0.229 |

As is clear from FIG. 56, the wavelength range of the anti-reflection coating 20, in which the maximum reflectance was 0.2% or less, was as narrow as 280 nm (between 390 nm and 670 nm).

EXAMPLES 5-1 TO 5-8

In each anti-reflection coating 40 comprising first to seventh layers 41-47 on a substrate 30 according to the second embodiment of the present invention, the optimization of the refractive index and optical thickness of each layer for the refractive index of the substrate 30 was simulated, with air having a refractive index of 1.00 as an incident-side medium. The design wavelength was 550 nm. The refractive index of and optical thickness of each layer in Examples 5-1-5-8 are shown in Table 6. The spectral reflectance of each anti-reflection coating 40 of Examples 5-1 to 5-8 to perpendicular incident light was calculated by simulation, with the refractive index dispersion of the substrate 30 and the layers 41-47 taken into consideration, and with reflection on an opposite surface of the substrate 30 to the anti-reflection coating 40 neglected. The calculation results of reflectance are shown in FIGS. 57-64.

TABLE 6

| | Example 5-1 | | Example 5-2 | | Example 5-3 | |
|---|---|---|---|---|---|---|
| Layer | Refractive Index | Optical Thickness (nm) | Refractive Index | Optical Thickness (nm) | Refractive Index | Optical Thickness (nm) |
| Substrate | 1.4300 | — | 1.4700 | — | 1.5200 | — |
| 1st Layer | 1.3800 | 266.45 | 1.4000 | 266.37 | 1.4000 | 266.33 |
| 2nd Layer | 2.1015 | 43.04 | 2.2102 | 43.14 | 2.3235 | 43.50 |
| 3rd Layer | 1.3801 | 41.11 | 1.4001 | 40.31 | 1.4318 | 40.33 |
| 4th Layer | 2.2743 | 166.88 | 2.3701 | 166.80 | 2.5052 | 166.80 |
| 5th Layer | 1.4607 | 15.33 | 1.4548 | 15.66 | 1.4521 | 15.91 |
| 6th Layer | 2.2825 | 71.15 | 2.3375 | 71.58 | 2.4179 | 71.70 |
| 7th Layer | 1.3800 | 133.57 | 1.3800 | 132.83 | 1.3800 | 132.36 |

| | Example 5-4 | | Example 5-5 | | Example 5-6 | |
|---|---|---|---|---|---|---|
| Layer | Refractive Index | Optical Thickness (nm) | Refractive Index | Optical Thickness (nm) | Refractive Index | Optical Thickness (nm) |
| Substrate | 1.5700 | — | 1.6200 | — | 1.6700 | — |
| 1st Layer | 1.4418 | 263.95 | 1.4829 | 260.93 | 1.5290 | 267.44 |
| 2nd Layer | 2.2522 | 52.96 | 2.2139 | 62.25 | 2.5178 | 45.84 |
| 3rd Layer | 1.4207 | 33.43 | 1.4794 | 29.40 | 1.5039 | 37.13 |
| 4th Layer | 2.5651 | 165.88 | 2.6532 | 164.96 | 2.6393 | 157.23 |
| 5th Layer | 1.4242 | 15.79 | 1.4791 | 16.11 | 1.4529 | 23.42 |
| 6th Layer | 2.4424 | 72.59 | 2.4519 | 74.67 | 2.6487 | 61.57 |
| 7th Layer | 1.3800 | 132.36 | 1.3800 | 131.27 | 1.3800 | 136.49 |

TABLE 6-continued

|  | Example 5-7 | | Example 5-8 | |
| --- | --- | --- | --- | --- |
| Layer | Refractive Index | Optical Thickness (nm) | Refractive Index | Optical Thickness (nm) |
| Substrate | 1.7200 | — | 1.7300 | — |
| 1st Layer | 1.5471 | 268.56 | 1.5471 | 269.44 |
| 2nd Layer | 2.6040 | 47.81 | 2.6932 | 44.70 |
| 3rd Layer | 1.4000 | 31.54 | 1.3800 | 31.80 |
| 4th Layer | 2.6998 | 157.77 | 2.6998 | 160.04 |
| 5th Layer | 1.4000 | 22.48 | 1.3800 | 21.68 |
| 6th Layer | 2.6988 | 61.95 | 2.7000 | 61.94 |
| 7th Layer | 1.3800 | 136.84 | 1.3800 | 136.69 |

As is clear from FIGS. 57-64, the anti-reflection coatings 40 of Examples 5-1-5-8 had the maximum reflectance reduced to 0.2% or less in a wavelength bandwidth of 330 nm between 390 nm and 720 nm. This indicates that the anti-reflection coating of the present invention has sufficiently reduced reflectance in a wide wavelength range with a small number of lamination, thereby suppressing problems such as flare and ghost, which extremely deteriorate the optical characteristics, to obtain excellent color balance.

Figure 70:
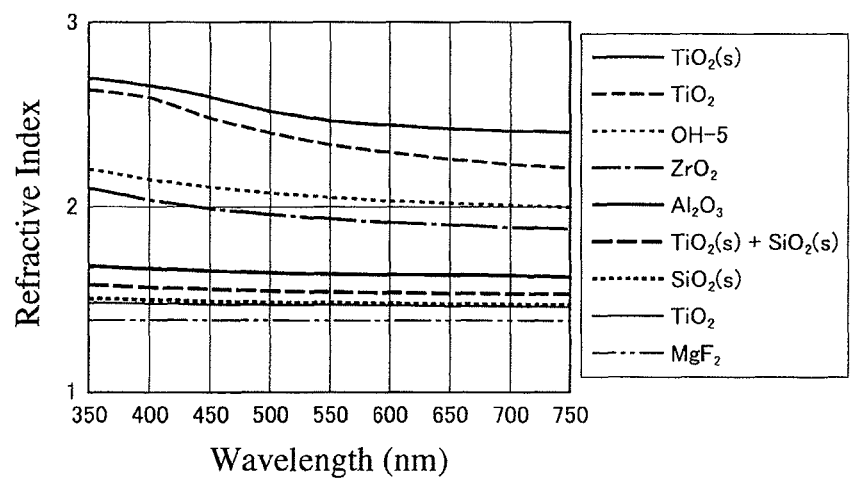
FIG. 70 is a graph showing the refractive index dispersion of a coating material used for the anti-reflection coating of each Example 5-1 to 5-12.
Figure 71:
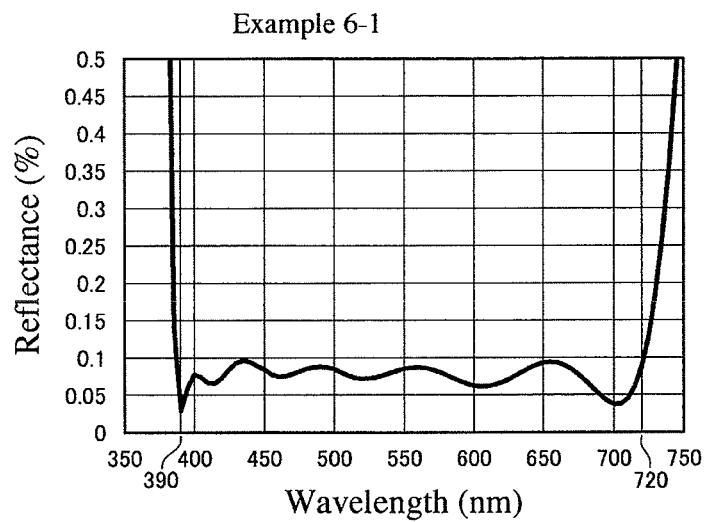
FIGS. 71-77 are graphs each showing the spectral characteristics of reflectance of the anti-reflection coating of each Example 6-1 to 6-8.
Figure 72:
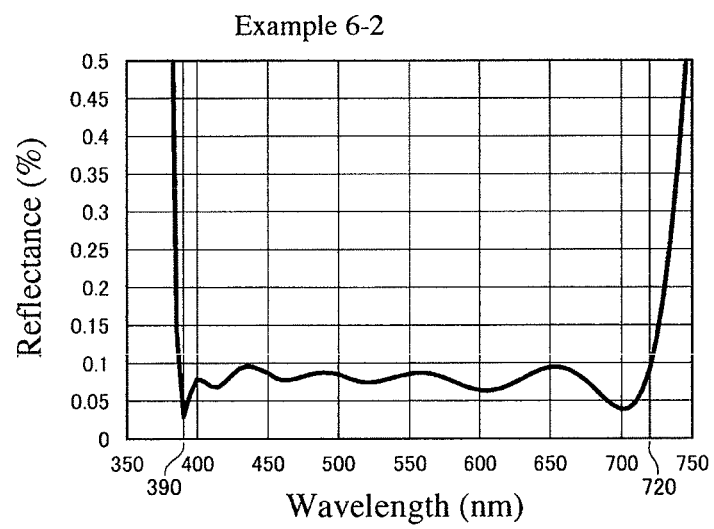
Figure 73:
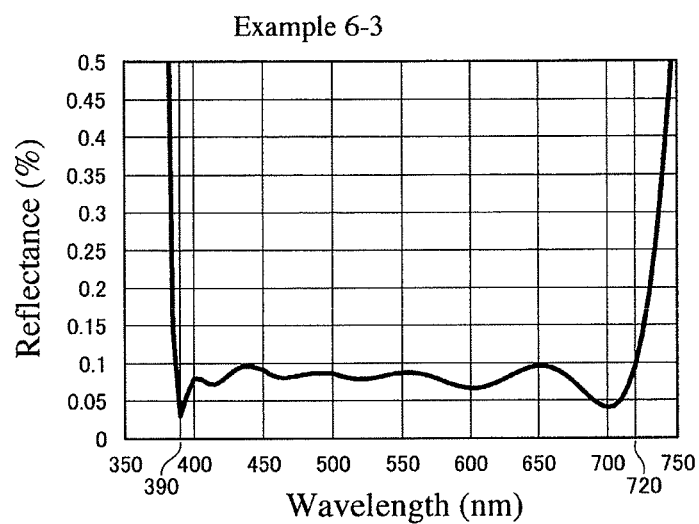
Figure 74:
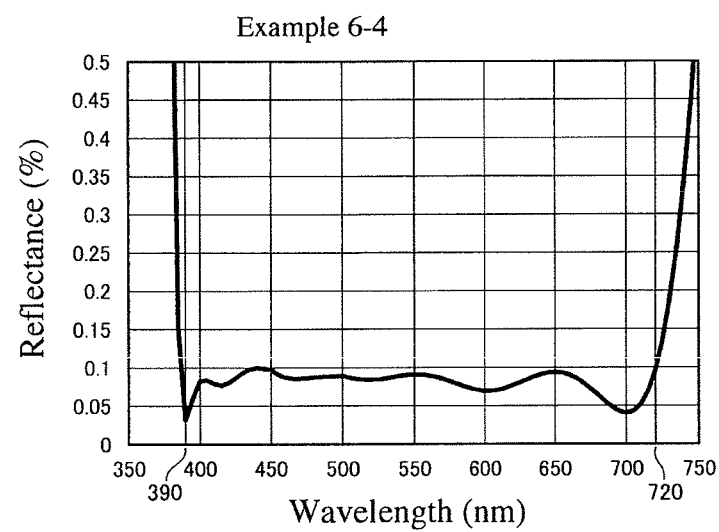
Figure 75:
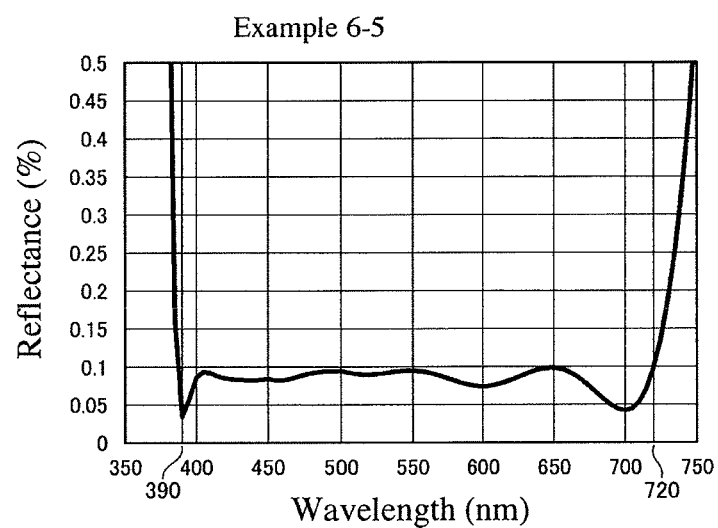
Figure 76:
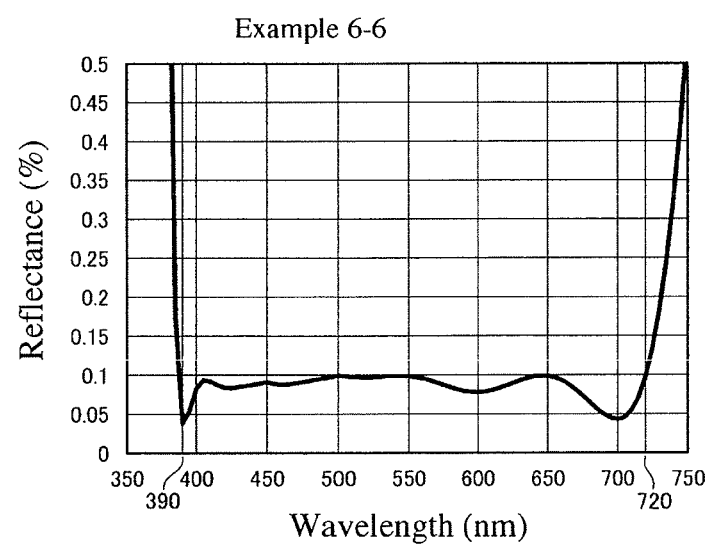
Figure 77:
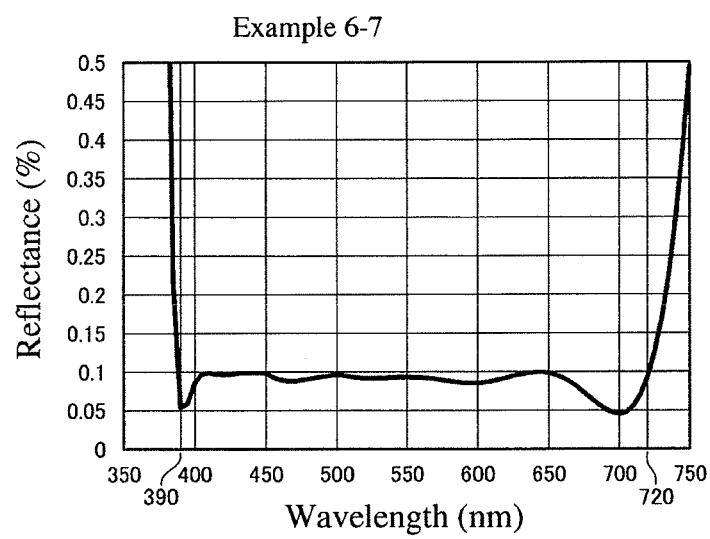
Figure 78:
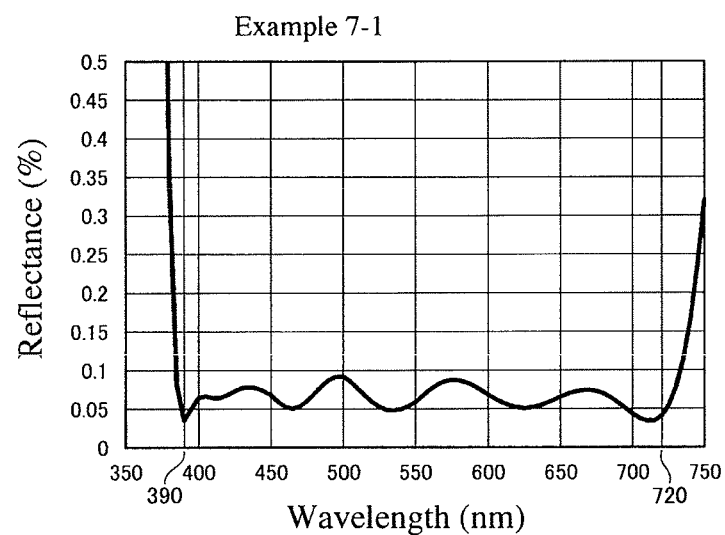
FIGS. 78-84 are graphs each showing the spectral characteristics of reflectance of the anti-reflection coating of each Example 8-1-7-8.
Figure 79:
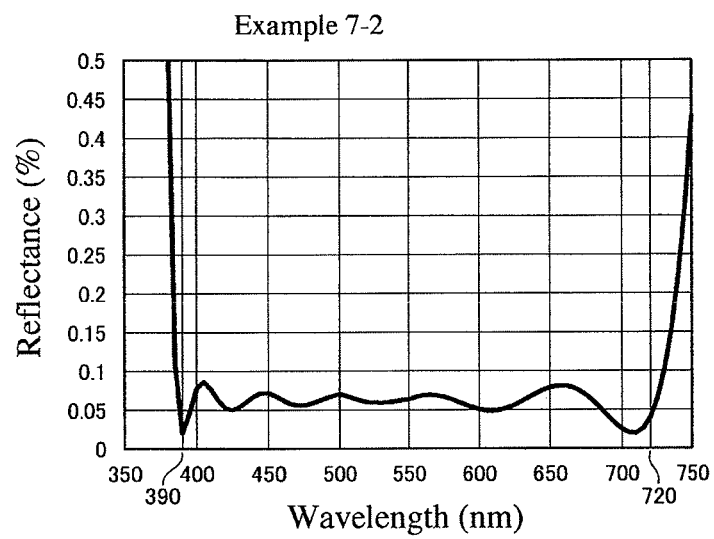
Figure 80:
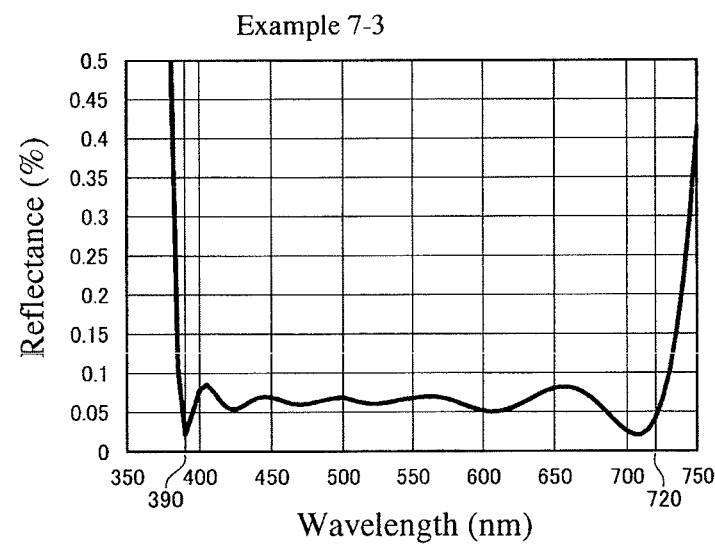
Figure 81:
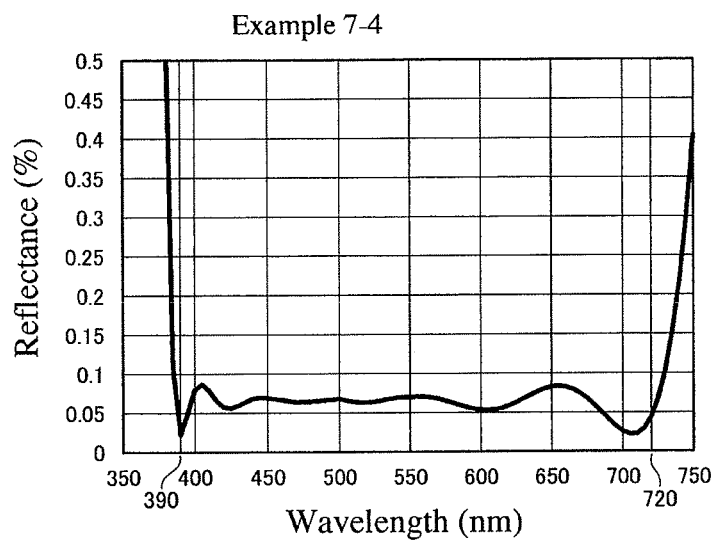
Figure 82:
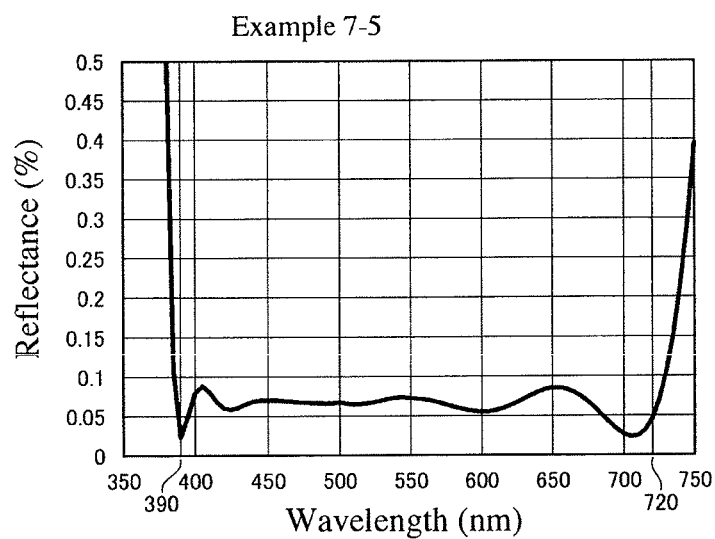
Figure 83:
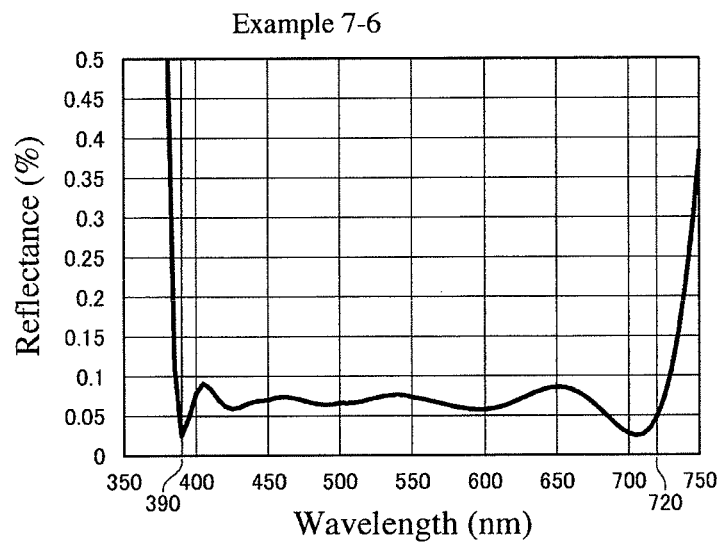
Figure 84:
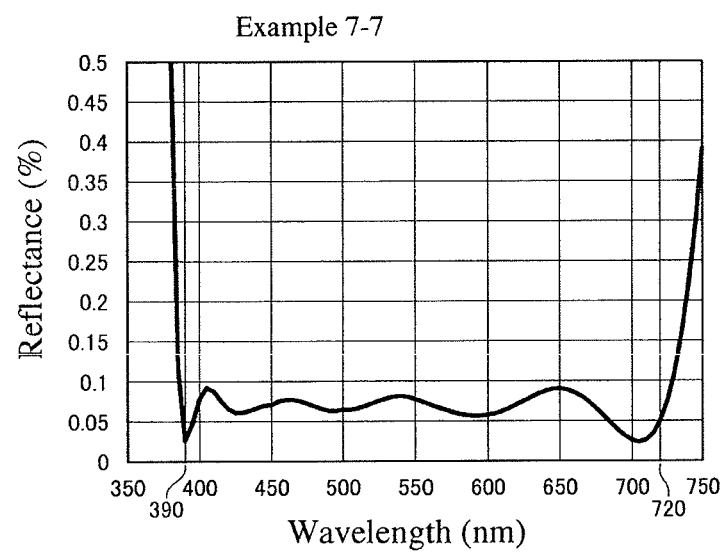

Referring to the results of Examples 5-1 to 5-8, anti-reflection coating materials having optimum refractive indices were selected for substrate materials actually used. The refractive index dispersion of each anti-reflection coating material is shown in FIG. 70. Reflection-preventing characteristics obtained by using these substrate materials and anti-reflection coating materials were simulated in Examples and Comparative Examples below.

EXAMPLE 5-9

Figure 65:
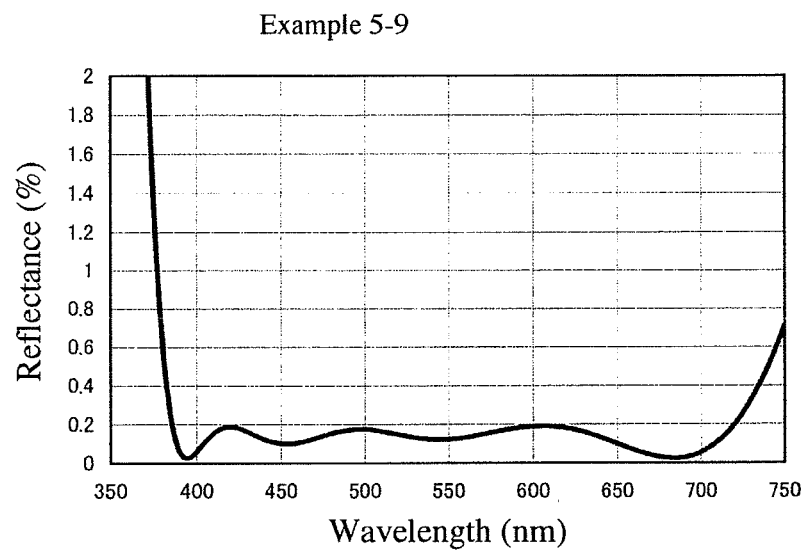

An anti-reflection coating 40 comprising first to seventh layers 41-47 made of the materials shown in Table 7 was formed on a substrate 30 of S-FSL5 (available from Ohara Inc., nd=1.4875) by a vapor deposition method. The spectral reflectance of the anti-reflection coating 40 to perpendicular incident light was calculated by simulation. The simulation results are shown in FIG. 65.

TABLE 7

| Layer | Material | Refractive Index | Optical Thickness (nm) |
| --- | --- | --- | --- |
| Substrate | S-FSL5 | 1.4875 | — |
| 1st Layer | MgF$_2$ | 1.3880 | 251.19 |
| 2nd Layer | ZrO$_2$ | 1.9217 | 63.51 |
| 3rd Layer | MgF$_2$ | 1.3880 | 25.01 |
| 4th Layer | TiO$_2$ | 2.3132 | 203.05 |
| 5th Layer | SiO$_2$ | 1.4682 | 18.00 |
| 6th Layer | TiO$_2$ | 2.3132 | 38.62 |
| 7th Layer | MgF$_2$ | 1.3880 | 121.39 |

EXAMPLE 5-10

Figure 66:
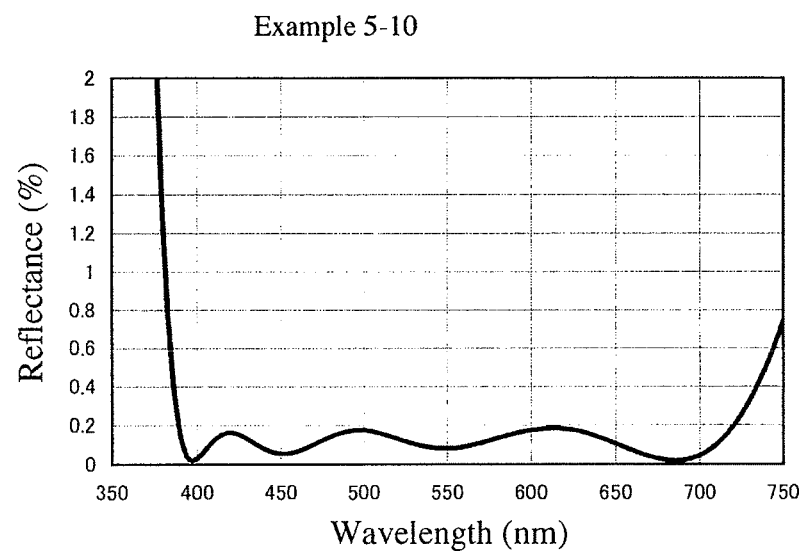

An anti-reflection coating 40 comprising first to seventh layers 41-47 made of the materials shown in Table 8 was formed on a substrate 30 of S-BSL7 (available from Ohara Inc., nd=1.5163) by a vapor deposition method. The spectral reflectance of the anti-reflection coating 40 to perpendicular incident light was calculated by simulation. The simulation results are shown in FIG. 66.

TABLE 8

| Layer | Material | Refractive Index | Optical Thickness (nm) |
| --- | --- | --- | --- |
| Substrate | S-BSL7 | 1.5163 | — |
| 1st Layer | MgF$_2$ | 1.3880 | 257.31 |
| 2nd Layer | TiO$_2$ | 2.3132 | 32.23 |
| 3rd Layer | SiO$_2$ | 1.4682 | 43.54 |
| 4th Layer | TiO$_2$ | 2.3132 | 204.30 |
| 5th Layer | SiO$_2$ | 1.4682 | 16.34 |
| 6th Layer | TiO$_2$ | 2.3132 | 40.53 |
| 7th Layer | MgF$_2$ | 1.3880 | 122.61 |

EXAMPLE 5-11

Figure 67:
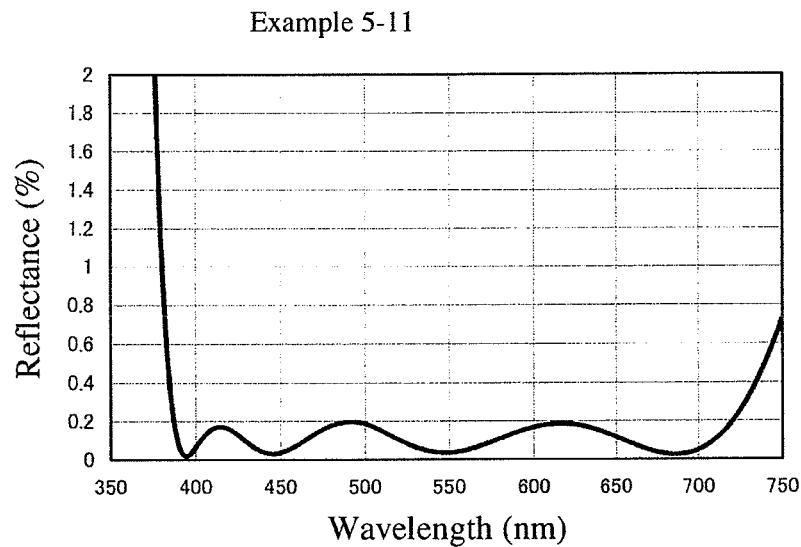

An anti-reflection coating 40 comprising first to seventh layers 41-47 made of the materials shown in Table 9 was formed on a substrate 30 of S-BSM15 (available from Ohara Inc., nd=1.6230) by a vapor deposition method. The spectral reflectance of the anti-reflection coating 40 to perpendicular incident light was calculated by simulation. The simulation results are shown in FIG. 67.

TABLE 9

| Layer | Material | Refractive Index | Optical Thickness (nm) |
| --- | --- | --- | --- |
| Substrate | S-BSM15 | 1.6230 | — |
| 1st Layer | SiO$_2$ | 1.4682 | 257.48 |
| 2nd Layer | TiO$_2$ | 2.3132 | 37.43 |
| 3rd Layer | SiO$_2$ | 1.4682 | 36.83 |
| 4th Layer | TiO$_2$ | 2.3132 | 170.03 |
| 5th Layer | SiO$_2$ | 1.4682 | 17.10 |
| 6th Layer | TiO$_2$ | 2.3132 | 55.25 |
| 7th Layer | MgF$_2$ | 1.3880 | 128.20 |

EXAMPLE 5-12

Figure 68:
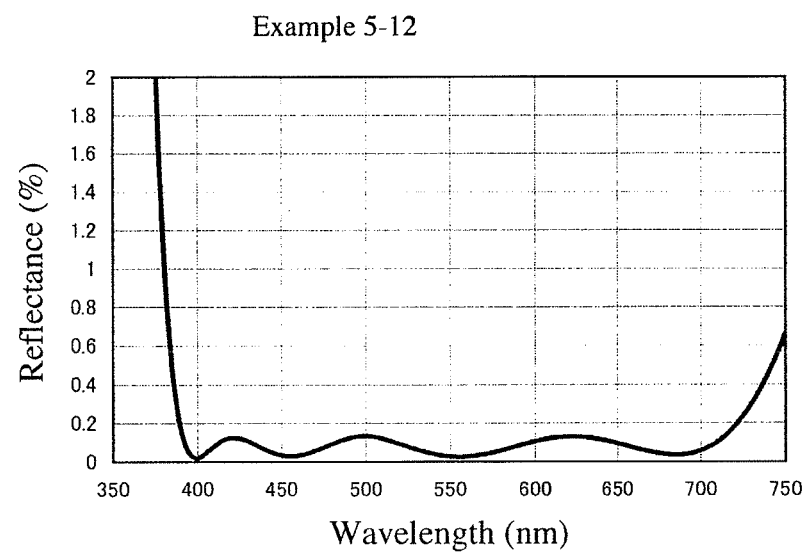

First to sixth layers 41-46 made of the materials shown in Table 10 was formed on a substrate 30 of S-LAL12 (available from Ohara Inc., nd=1.6779) by a sputtering method, and a seventh layer 47 made of the material shown in Table 10 was formed thereon by a vapor deposition method to obtain an anti-reflection coating 40. The sputtered first layer 41 comprised 94% of TiO$_2$ and 6% of SiO$_2$. The spectral reflectance of the anti-reflection coating 40 to perpendicular incident light was calculated by simulation. The simulation results are shown in FIG. 68.

TABLE 10

| Layer | Material | Refractive Index | Optical Thickness (nm) |
|---|---|---|---|
| Substrate | S-LAL12 | 1.6779 | — |
| 1st Layer* | $TiO_2$ + $SiO_2$ | 1.5399 | 263.94 |
| 2nd Layer* | $TiO_2$ | 2.4550 | 40.52 |
| 3rd Layer* | $SiO_2$ | 1.4815 | 36.16 |
| 4th Layer* | $TiO_2$ | 2.4550 | 157.29 |
| 5th Layer* | $SiO_2$ | 1.4815 | 20.57 |
| 6th Layer* | $TiO_2$ | 2.4550 | 61.02 |
| 7th Layer | $MgF_2$ | 1.3880 | 132.91 |

Note:
*Formed by a sputtering method.

COMPARATIVE EXAMPLE 2

Figure 69:
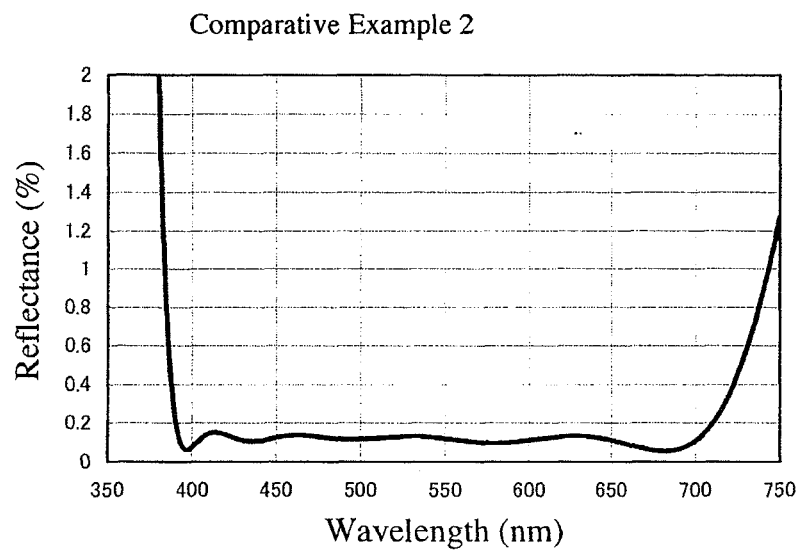
FIG. 69 is a graph showing the spectral characteristics of reflectance of the anti-reflection coating of Comparative Example 2.

An anti-reflection coating comprising first to ninth layers made of the materials shown in Table 11 was formed on a substrate of S-BSM15 (available from Ohara Inc., nd=1.6230) by a vapor deposition method. OH-5 in the anti-reflection coating is a depositing material comprising $TiO_2$ and $ZrO_2$, which is available from Canon Optron, Inc. The spectral reflectance of the anti-reflection coating to perpendicular incident light was calculated by simulation, with the refractive index dispersion of the substrate and the layers taken into consideration, and with reflection on an opposite surface of the substrate to the anti-reflection coating neglected. The simulation results are shown in FIG. 69.

TABLE 11

| Layer | Material | Refractive Index | Optical Thickness (nm) |
|---|---|---|---|
| Substrate | S-BSM15 | 1.6230 | — |
| 1st Layer | $Al_2O_3$ | 1.6362 | 33.42 |
| 2nd Layer | OH-5 | 2.0422 | 34.15 |
| 3rd Layer | $SiO_2$ | 1.4682 | 36.90 |
| 4th Layer | OH-5 | 2.0422 | 142.03 |
| 5th Layer | $SiO_2$ | 1.4682 | 2.38 |
| 6th Layer | OH-5 | 2.0422 | 120.22 |
| 7th Layer | $Al_2O_3$ | 1.6362 | 202.95 |
| 8th Layer | $SiO_2$ | 1.4682 | 33.28 |
| 9th Layer | OH-5 | 2.0422 | 253.78 |
| 10th Layer | $MgF_2$ | 1.3880 | 125.34 |

The comparison of Examples 5-9 to 5-12 with Comparative Example 2 revealed that the anti-reflection coatings having the layer structures in Examples 5-9-5-12 have the maximum reflectance reduced to 0.2% or less in a wavelength bandwidth of 330 nm between 390 nm and 720 nm, while the anti-reflection coating having the layer structure in Comparative Example 2 has the maximum reflectance exceeding 0.2%.

As described above, the anti-reflection coating according to the second embodiment of the present invention has sufficiently reduced reflectance in a wide wavelength range with a small number of lamination, thereby suppressing problems such as flare and ghost, which extremely deteriorate the optical characteristics, to obtain excellent color balance.

EXAMPLES 6-1 TO 6-7

High-refractive-index layers 61, 63, 65, 67, 69, 71 and 73 made of $Nb_2O_5$ having a refractive index of 2.312 to the d-line, and intermediate-refractive-index layers 62, 64, 66, 68, 70 and 72 made of a mixture of $Nb_2O_5$ and $SiO_2$ having a refractive index of 1.501 to the d-line were formed by a sputtering method, and a low-refractive-index layer 74 made of $MgF_2$ having a refractive index of 1.388 to the d-line was formed by a vapor deposition method, to form the anti-reflection coating 60 having the layer structure shown in FIG. 3 according to the third embodiment of the present invention on a substrate 50. The substrates 50 used in Examples 6-1 to 6-7 were seven types of optical glass; S-FPL53 (available from Ohara Inc., nd=1.4388), S-BSL7 (available from Ohara Inc., nd=1.5163), S-BSM15 (available from Ohara Inc., nd=1.6230), S-LaL10 (available from Ohara Inc., nd=1.72000), S-LAH54 (available from Ohara Inc., nd=1.8155), S-NPH2 (available from Ohara Inc., nd=1.9229), and TAFD40 (available from HOYA Corporation, nd=2.0007), respectively.

With air having a refractive index of 1.00 as an incident-side medium, the optimum optical thickness of each layer 61-74 in each anti-reflection coating 60 was calculated by simulation. The optimum optical thickness of each layer is shown in Table 12.

TABLE 12

| | | Optical Thickness (nm) | | | |
|---|---|---|---|---|---|
| Layer | | Example 6-1 | Example 6-2 | Example 6-3 | Example 6-4 |
| Substrate | — | S-FPL53 | S-BSL7 | S-BSM15 | S-LAL10 |
| 1st Layer | $Nb_2O_5$ | 11.85 | 16.99 | 23.12 | 28.34 |
| 2nd Layer | $Nb_2O_5$ + $SiO_2$ | 86.65 | 71.56 | 56.50 | 45.40 |
| 3rd Layer | $Nb_2O_5$ | 55.02 | 61.80 | 71.66 | 81.18 |
| 4th Layer | $Nb_2O_5$ + $SiO_2$ | 28.64 | 25.88 | 21.32 | 16.77 |
| 5th Layer | $Nb_2O_5$ | 159.58 | 159.70 | 160.02 | 161.04 |
| 6th Layer | $Nb_2O_5$ + $SiO_2$ | 33.34 | 34.47 | 36.07 | 37.43 |
| 7th Layer | $Nb_2O_5$ | 46.64 | 45.80 | 44.39 | 42.85 |
| 8th Layer | $Nb_2O_5$ + $SiO_2$ | 165.88 | 167.35 | 168.31 | 169.51 |
| 9th Layer | $Nb_2O_5$ | 23.18 | 23.55 | 24.17 | 24.80 |
| 10th Layer | $Nb_2O_5$ + $SiO_2$ | 56.51 | 55.91 | 55.09 | 54.14 |
| 11th Layer | $Nb_2O_5$ | 154.66 | 154.36 | 155.64 | 156.15 |
| 12th Layer | $Nb_2O_5$ + $SiO_2$ | 14.76 | 15.00 | 15.09 | 15.38 |
| 13th Layer | $Nb_2O_5$ | 68.49 | 68.46 | 67.82 | 67.34 |
| 14th Layer | $MgF_2$ | 128.70 | 128.87 | 128.95 | 129.22 |

TABLE 12-continued

| Layer | | Optical Thickness (nm) | | |
|---|---|---|---|---|
| | | Example 6-5 | Example 6-6 | Example 6-7 |
| Substrate | — | S-LAH54 | S-NPH2 | TAFD40 |
| 1st Layer | $Nb_2O_5$ | 33.13 | 35.89 | 41.85 |
| 2nd Layer | $Nb_2O_5 + SiO_2$ | 35.64 | 24.95 | 19.20 |
| 3rd Layer | $Nb_2O_5$ | 90.63 | 98.34 | 111.96 |
| 4th Layer | $Nb_2O_5 + SiO_2$ | 12.02 | 7.25 | 2.28 |
| 5th Layer | $Nb_2O_5$ | 162.89 | 165.05 | 172.52 |
| 6th Layer | $Nb_2O_5 + SiO_2$ | 38.63 | 39.65 | 40.77 |
| 7th Layer | $Nb_2O_5$ | 41.06 | 39.33 | 37.67 |
| 8th Layer | $Nb_2O_5 + SiO_2$ | 169.94 | 169.13 | 168.86 |
| 9th Layer | $Nb_2O_5$ | 25.36 | 26.11 | 26.93 |
| 10th Layer | $Nb_2O_5 + SiO_2$ | 53.15 | 52.41 | 51.69 |
| 11th Layer | $Nb_2O_5$ | 156.62 | 157.01 | 157.67 |
| 12th Layer | $Nb_2O_5 + SiO_2$ | 15.59 | 15.91 | 16.03 |
| 13th Layer | $Nb_2O_5$ | 66.88 | 66.32 | 66.24 |
| 14th Layer | $MgF_2$ | 129.17 | 129.30 | 129.78 |

Figure 87:
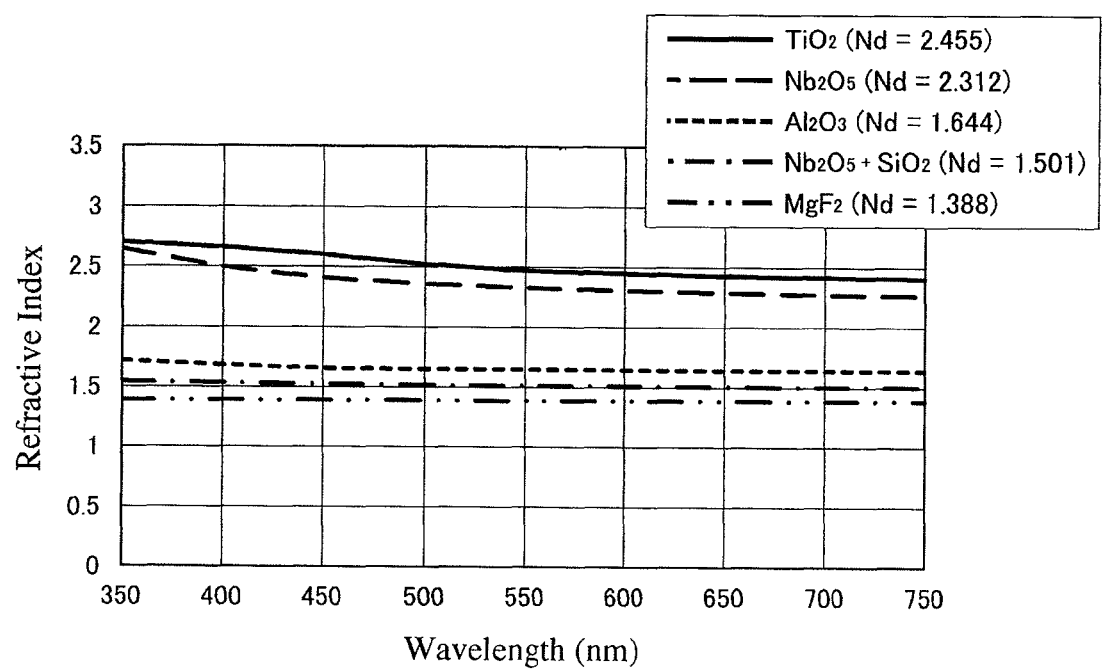
FIG. 87 is a graph showing the refractive index dispersion of a coating material used for the anti-reflection coating of each Example 6-1 to 6-8 and 7-1 to 7-8.

The spectral reflectance of each anti-reflection coating 60 of Examples 6-1 to 6-7 to perpendicular incident light (incident angle=0°) was calculated by simulation, with the refractive index dispersion of the substrate 50 and the layers 61-74 of the anti-reflection coating 60 taken into consideration, and with reflection on an opposite surface of the substrate 50 to the anti-reflection coating 60 neglected. The calculation results are shown in FIGS. 71-76. The refractive index dispersion of each material used in the anti-reflection coating 60 is shown in FIG. 87.

EXAMPLES 7-1 TO 7-7

Anti-reflection coatings 60 were produced in the same manner as in Examples 6-1 to 6-7, except for changing the high-refractive-index material to $TiO_2$ having a refractive index of 2.455 and the intermediate-refractive-index material to $Al_2O_3$ having a refractive index of 1.644 as shown in Table 13. The optical thickness of each layer 61-74 was calculated by simulation in the same manner as in Examples 6-1 to 6-7. The spectral reflectance of each anti-reflection coating 60 of Examples 7-1 to 7-7 to perpendicular incident light (incident angle=0°) was calculated by simulation in the same manner as in Examples 6-1 to 6-7. The calculation results are shown in FIGS. 77-84.

TABLE 13

| Layer | | Optical Thickness (nm) | | | |
|---|---|---|---|---|---|
| | | Example 7-1 | Example 7-2 | Example 7-3 | Example 7-4 |
| Substrate | — | S-FPL53 | S-BSL7 | S-BSM15 | S-LAL10 |
| 1st Layer | $TiO_2$ | 2.50 | 8.38 | 16.05 | 21.64 |
| 2nd Layer | $Al_2O_3$ | 122.58 | 98.85 | 75.56 | 61.36 |
| 3rd Layer | $TiO_2$ | 52.41 | 53.62 | 62.73 | 71.42 |
| 4th Layer | $Al_2O_3$ | 27.55 | 29.59 | 26.58 | 22.67 |
| 5th Layer | $TiO_2$ | 153.34 | 152.47 | 153.14 | 154.67 |
| 6th Layer | $Al_2O_3$ | 37.95 | 36.72 | 38.03 | 39.18 |
| 7th Layer | $TiO_2$ | 43.18 | 45.11 | 44.26 | 43.12 |
| 8th Layer | $Al_2O_3$ | 158.14 | 160.60 | 162.48 | 163.53 |
| 9th Layer | $TiO_2$ | 29.18 | 27.81 | 28.21 | 28.71 |
| 10th Layer | $Al_2O_3$ | 52.83 | 54.10 | 53.46 | 52.80 |
| 11th Layer | $TiO_2$ | 151.57 | 152.65 | 153.40 | 153.82 |
| 12th Layer | $Al_2O_3$ | 25.10 | 24.37 | 24.48 | 24.65 |
| 13th Layer | $TiO_2$ | 59.29 | 59.89 | 59.68 | 59.50 |
| 14th Layer | $MgF_2$ | 132.39 | 132.33 | 132.50 | 132.66 |

TABLE 13-continued

| Layer | | Optical Thickness (nm) | | |
|---|---|---|---|---|
| | | Example 7-5 | Example 7-6 | Example 7-7 |
| Substrate | — | S-LAH54 | S-NPH2 | TAFD40 |
| 1st Layer | $TiO_2$ | 26.69 | 30.08 | 34.67 |
| 2nd Layer | $Al_2O_3$ | 50.15 | 38.27 | 31.90 |
| 3rd Layer | $TiO_2$ | 80.52 | 87.52 | 97.43 |
| 4th Layer | $Al_2O_3$ | 18.53 | 14.32 | 10.08 |
| 5th Layer | $TiO_2$ | 155.70 | 158.31 | 160.98 |
| 6th Layer | $Al_2O_3$ | 40.35 | 41.08 | 41.67 |
| 7th Layer | $TiO_2$ | 41.87 | 40.68 | 39.31 |
| 8th Layer | $Al_2O_3$ | 164.47 | 164.83 | 165.93 |
| 9th Layer | $TiO_2$ | 29.24 | 29.73 | 29.97 |
| 10th Layer | $Al_2O_3$ | 52.10 | 51.51 | 50.73 |
| 11th Layer | $TiO_2$ | 154.15 | 154.38 | 154.69 |
| 12th Layer | $Al_2O_3$ | 24.84 | 25.03 | 25.10 |
| 13th Layer | $TiO_2$ | 59.30 | 59.12 | 58.84 |
| 14th Layer | $MgF_2$ | 132.80 | 132.94 | 132.93 |

COMPARATIVE EXAMPLE 3

Figure 85:
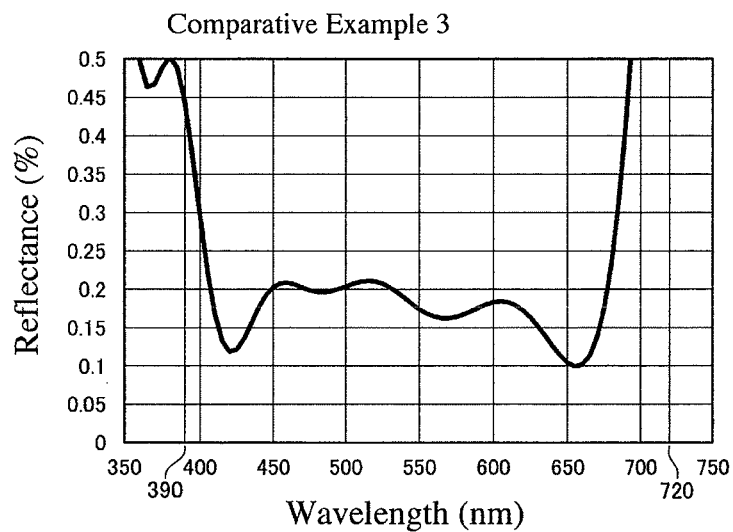
FIG. 85 is a graph showing the spectral characteristics of reflectance of the anti-reflection coating of Comparative Example 3.

Referring to Embodiment 4 in JP 2000-111702 A, layers made of $Ta_2O_5$ having a refractive index of 2.233, and layers made of $SiO_2$ having a refractive index of 1.487 were alternately formed on a substrate made of S-BSL7, and a layer made of $MgF_2$ having a refractive index of 1.388 was formed thereon to form a 14-layer anti-reflection coating. The optimum optical thickness of each layer in this anti-reflection coating was calculated by simulation, with air having a refractive index of 1.00 as an incident-side medium. The results are shown in Table 14. The spectral reflectance of this anti-reflection coating to perpendicular incident light (incident angle=0°) was calculated by simulation in the same manner as in Examples 6-1 to 6-7. The calculation results are shown in FIG. 85.

TABLE 14

| Layer | Material | Refractive Index | Optical Thickness (nm) |
|---|---|---|---|
| Substrate | S-BSL7 | 1.5163 | — |
| 1st Layer | $Ta_2O_5$ | 2.2330 | 19.18 |
| 2nd Layer | $SiO_2$ | 1.4870 | 58.93 |
| 3rd Layer | $Ta_2O_5$ | 2.2330 | 60.42 |
| 4th Layer | $SiO_2$ | 1.4870 | 22.31 |
| 5th Layer | $Ta_2O_5$ | 2.2330 | 131.16 |
| 6th Layer | $SiO_2$ | 1.4870 | 33.86 |

TABLE 14-continued

| Layer | Material | Refractive Index | Optical Thickness (nm) |
|---|---|---|---|
| 7th Layer | $Ta_2O_5$ | 2.2330 | 40.48 |
| 8th Layer | $SiO_2$ | 1.4870 | 171.20 |
| 9th Layer | $Ta_2O_5$ | 2.2330 | 19.12 |
| 10th Layer | $SiO_2$ | 1.4870 | 43.20 |
| 11th Layer | $Ta_2O_5$ | 2.2330 | 139.26 |
| 12th Layer | $SiO_2$ | 1.4870 | 9.86 |
| 13th Layer | $Ta_2O_5$ | 2.2330 | 72.12 |
| 14th Layer | $MgF_2$ | 1.3880 | 116.05 |

COMPARATIVE EXAMPLE 4

Referring to Embodiment 3 in JP 2002-14203 A, layers made of $Ta_2O_5$ having a refractive index of 2.233, layers made of $TiO_2$ having a refractive index of 2.455, and layers made of $SiO_2$ having a refractive index of 1.450 were formed on a substrate made of S-BSL7, to form a 14-layer anti-reflection coating. The optimum optical thickness of each layer in this anti-reflection coating was calculated by simulation, with air having a refractive index of 1.00 as an incident-side medium. The results are shown in Table 15. The spectral reflectance of this anti-reflection coating to perpendicular incident light (incident angle=0°) was calculated by simulation in the same manner as in Examples 6-1 to 6-7. The calculation results are shown in FIG. 86.

TABLE 15

| Layer | Material | Refractive Index | Optical Thickness (nm) |
|---|---|---|---|
| Substrate | S-BSL7 | 1.5163 | — |
| 1st Layer | $TiO_2$ | 2.4550 | 15.63 |
| 2nd Layer | $SiO_2$ | 1.4500 | 76.58 |
| 3rd Layer | $TiO_2$ | 2.4550 | 56.18 |
| 4th Layer | $SiO_2$ | 1.4500 | 36.73 |
| 5th Layer | $TiO_2$ | 2.4550 | 146.16 |
| 6th Layer | $SiO_2$ | 1.4500 | 21.16 |
| 7th Layer | $Ta_2O_5$ | 2.2330 | 83.59 |
| 8th Layer | $SiO_2$ | 1.4500 | 176.97 |
| 9th Layer | $Ta_2O_5$ | 2.2330 | 21.16 |
| 10th Layer | $SiO_2$ | 1.4500 | 60.83 |
| 11th Layer | $TiO_2$ | 2.4550 | 156.40 |
| 12th Layer | $SiO_2$ | 1.4500 | 5.95 |
| 13th Layer | $TiO_2$ | 2.4550 | 82.22 |
| 14th Layer | $SiO_2$ | 1.4500 | 127.65 |

Figure 86:
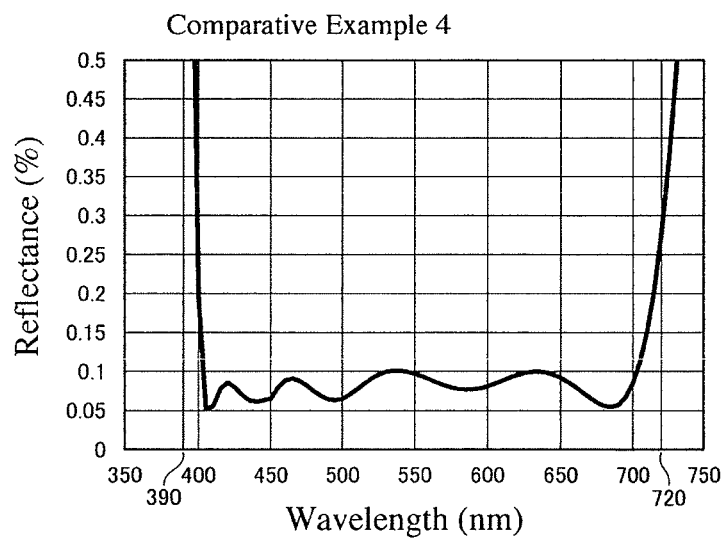
FIG. 86 is a graph showing the spectral characteristics of reflectance of the anti-reflection coating of Comparative Example 4.

The anti-reflection coatings according to the third embodiment of the present invention had reflectance of 0.1% or less in a wavelength bandwidth of 330 nm between 390 nm and 720 nm as shown in FIGS. 71-84, while those of Comparative Examples 3 and 4 failed to achieve the target of reducing reflectance to 0.1% or less in a wavelength of 390 nm to 720 nm as shown in FIGS. 85 and 86.

EFFECTS OF THE INVENTION

The anti-reflection coating of the present invention has not only low reflectance in a wide visible light band having a wavelength of 390 nm to 720 nm, but also extremely high transmission characteristics and excellent color balance. Accordingly, the use of such anti-reflection coating provides high-performance optical members and optical equipments free from problems such as flare and ghost, which extremely deteriorate the optical characteristics.

What is claimed is:

1. An anti-reflection coating comprising first to ninth layers laminated in this order on a substrate for having reflectance of 0.2% or less to light in a visible wavelength range of 390-720 nm,
    said second, fourth, sixth and eighth layers being high-refractive-index layers each formed by a high-refractive-index material having a refractive index of 2.21-2.70 to a helium d-line having a wavelength of 587.56 nm;
    said first, third, fifth and seventh layers being intermediate-refractive-index layers each formed by an intermediate-refractive-index material having a refractive index of 1.40 or more and less than 1.55 to said d-line; and
    said ninth layer being a low-refractive-index layer formed by a low-refractive-index material having a refractive index of 1.35 or more and less than 1.40 to said d-line;
    wherein the refractive index difference between said intermediate-refractive-index layers and said high-refractive-index layers is 0.67-1.30.

2. The anti-reflection coating according to claim 1, wherein said high-refractive-index material is $TiO_2$, $Nb_2O_5$, or a mixture or compound of at least two of $TiO_2$, $Nb_2O_5$, $CeO_2$, $Ta_2O_5$, ZnO, $ZrO_2$, $In_2O_3$, $SnO_2$ and $HfO_2$; wherein said intermediate-refractive-index material is $SiO_2$, $YbF_3$, $YF_3$, or a mixture or compound of at least two of $SiO_2$, $Al_2O_3$, $CeF_3$, $NdF_3$, $GdF_3$, $LaF_3$, $YbF_3$ and $YF_3$; and wherein said low-refractive-index material is $MgF_2$, $AlF_3$, or a mixture or compound of at least two of $MgF_2$, $AlF_3$ and $SiO_2$.

3. The anti-reflection coating according to claim 1, wherein said substrate has a refractive index of 1.40-2.10 to said d-line.

4. An optical member comprising the anti-reflection coating recited in claim 1.

5. An optical equipment comprising the optical member recited in claim 4.

6. A anti-reflection coating comprising first to seventh layers laminated in this order on an optical substrate with a refractive index of 1.43-1.73 to a helium d-line having a wavelength of 587.56 nm for having reflectance of 0.2% or less to light in a visible wavelength range of 390-720 nm,
    said first layer having a refractive index of 1.37-1.56 to said d-line, and an optical thickness of 230-290 nm;
    said second layer having a refractive index of 1.85-2.7 to said d-line, and an optical thickness of 20-80 nm;
    said third layer having a refractive index of 1.37-1.52 to said d-line, and an optical thickness of 10-60 nm;
    said fourth layer having a refractive index of 2.1-2.7 to said d-line, and an optical thickness of 130-220 nm;
    said fifth layer having a refractive index of 1.37-1.52 to said d-line, and an optical thickness of 5-40 nm;
    said sixth layer having a refractive index of 2.1-2.7 to said d-line, and an optical thickness of 20-90 nm; and
    said seventh layer having a refractive index of 1.37-1.4 to said d-line, and an optical thickness of 100-160 nm.

7. The anti-reflection coating according to claim 6, wherein said seventh layer has a refractive index equal to or less than those of said first, third and fifth layers.

8. The anti-reflection coating according to claim 6, wherein said first, third and fifth layers are made of $MgF_2$ or $SiO_2$, or a mixture or compound of $SiO_2$ with $Al_2O_3$, $Nb_2O_5$ or $TiO_2$; wherein said second, fourth and sixth layers are made of $TiO_2$, $Nb_2O_5$, $CeO_2$, $Ta_2O_5$, $ZrO_2$, or any of their mixtures or compounds with $SiO_2$, and wherein said seventh layer is made of $MgF_2$, or a mixture or compound of $MgF_2$ with $SiO_2$, $CaF_2$ or LiF.

9. An optical member comprising the anti-reflection coating recited in claim 6.

10. An optical equipment comprising the optical member recited in claim 9.

11. A anti-reflection coating comprising first to fourteenth layers laminated in this order on an optical substrate having a refractive index of 1.43-2.01 to helium d-line having a wavelength of 587.56 nm, said first, third, fifth, seventh, ninth, eleventh and thirteenth layers being high-refractive-index layers formed by high-refractive-index materials having refractive indices of 2.201-2.7 to said d-line;

said second, fourth, sixth, eighth, tenth and twelfth layers being intermediate-refractive-index layers formed by an intermediate-refractive-index material having a refractive index of 1.501-1.7 to said d-line;

said fourteenth layer being a low-refractive-index layer formed by a low-refractive-index material having a refractive index of 1.37-1.44 to said d-line;

said first layer having an optical thickness of 5-45 nm;
said second layer having an optical thickness of 15-125 nm;
said third layer having an optical thickness of 40-130 nm;
said fourth layer having an optical thickness of 1-45 nm;
said fifth layer having an optical thickness of 135-175 nm;
said sixth layer having an optical thickness of 20-50 nm;
said seventh layer having an optical thickness of 30-65 nm;
said eighth layer having an optical thickness of 155-180 nm;
said ninth layer having an optical thickness of 10-35 nm;
said tenth layer having an optical thickness of 45-75 nm;
said eleventh layer having an optical thickness of 147-170 nm;
said twelfth layer having an optical thickness of 5-28 nm;
said thirteenth layer having an optical thickness of 55-85 nm; and
said fourteenth layer having an optical thickness of 120-145 nm.

12. The anti-reflection coating according to claim 11, wherein said optical substrate is made of optical glass, resins or optical crystals.

13. The anti-reflection coating according to claim 11, wherein said high-refractive-index material is $TiO_2$ and/or $Nb_2O_5$; wherein said intermediate-refractive-index material is $Al_2O_3$, a mixture of $SiO_2$ with $TiO_2$, a mixture of $SiO_2$ with $Nb_2O_5$, a mixture of $Al_2O_3$ with $TiO_2$, or a mixture of $Al_2O_3$ with $Nb_2O_5$; and wherein said low-refractive-index material is $MgF_2$.

14. An optical member comprising the anti-reflection coating recited in claim 11.

15. An optical equipment comprising the optical member recited in claim 14.

* * * * *